US 9,415,967 B2

(12) United States Patent
Wakide

(10) Patent No.: US 9,415,967 B2
(45) Date of Patent: Aug. 16, 2016

(54) POST-PROCESSING DEVICE AND IMAGE FORMING APPARATUS WITH NORMAL MODE POST PROCESS AND HIGH-SPEED MODE POST PROCESS

(71) Applicant: KONICA MINOLTA, INC., Chiyoda-ku, Tokyo (JP)

(72) Inventor: Hitoshi Wakide, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/798,107

(22) Filed: Jul. 13, 2015

(65) Prior Publication Data

US 2016/0016750 A1   Jan. 21, 2016

(30) Foreign Application Priority Data

Jul. 16, 2014   (JP) ................. 2014-146226

(51) Int. Cl.
*G06F 15/00* (2006.01)
*G06K 1/00* (2006.01)
*G06K 15/00* (2006.01)
(Continued)

(52) U.S. Cl.
CPC ............ *B65H 31/36* (2013.01); *B65H 31/26* (2013.01); *B65H 37/00* (2013.01); *B65H 39/00* (2013.01); *B65H 43/00* (2013.01); *H04N 1/0032* (2013.01); *H04N 1/0066* (2013.01); *H04N 1/00591* (2013.01); *H04N 1/00631* (2013.01); *G06K 15/404* (2013.01); *H04N 2201/0082* (2013.01); *H04N 2201/0094* (2013.01)

(58) Field of Classification Search
CPC .................................................. G06K 15/404

USPC .................................................. 358/1.1–1.18
See application file for complete search history.

(56) References Cited

U.S. PATENT DOCUMENTS 7,862,023 B2 *  1/2011  Ichihashi ................. B42C 1/12
                                                    270/58.07
8,104,758 B2 *  1/2012  Tanaka .................. B65H 31/34
                                                    270/58.08

FOREIGN PATENT DOCUMENTS

JP   2001220050 A   8/2001
JP   2004189348 A   7/2004
JP   2007145528 A   6/2007

OTHER PUBLICATIONS

Japanese Office Action (and English translation thereof) dated Apr. 5, 2016, issued in counterpart Japanese Application No. 2014-146226.

*Primary Examiner* — Douglas Tran
(74) *Attorney, Agent, or Firm* — Holtz, Holtz & Volek PC

(57) ABSTRACT

A post-processing device for applying a post-process to one or more sheets outputted by a device of a preceding stage, a printer for example, is provided. The post-processing device includes: an alignment mechanism for applying an alignment process for arranging a current sheet bundle; an output mechanism for outputting the current sheet bundle; a prestacking mechanism; and a control unit. The control unit performs a control in such a manner that at least a part of operation of the alignment mechanism or of operation of the output mechanism is switched from a normal operation mode for operation at a normal operation speed to a high-speed operation mode for operation at an operation speed greater than the normal operation speed when a time to completely output the current sheet bundle is later than a time to completely perform prestacking the next sheet bundle.

13 Claims, 23 Drawing Sheets

(51) Int. Cl.
*B65H 31/36* (2006.01)
*B65H 31/26* (2006.01)
*B65H 39/00* (2006.01)
*B65H 43/00* (2006.01)
*B65H 37/00* (2006.01)
*H04N 1/00* (2006.01)
*G06F 3/12* (2006.01)

FIG. 6
(a) 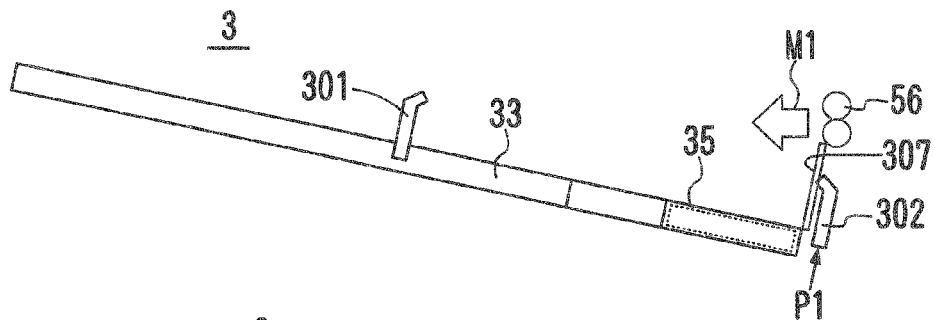
(b) 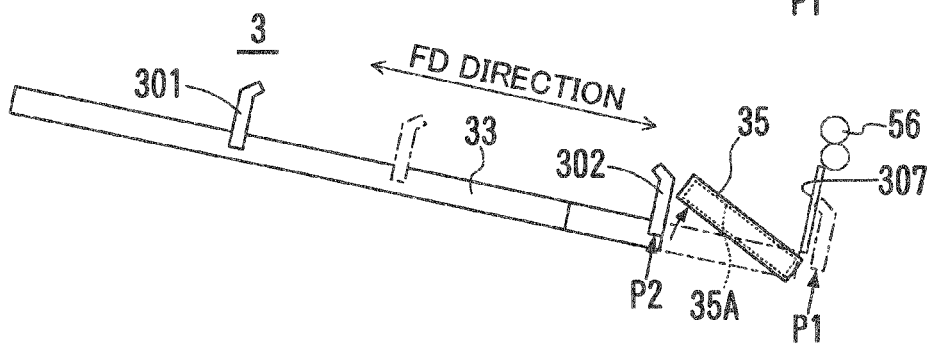
(c) 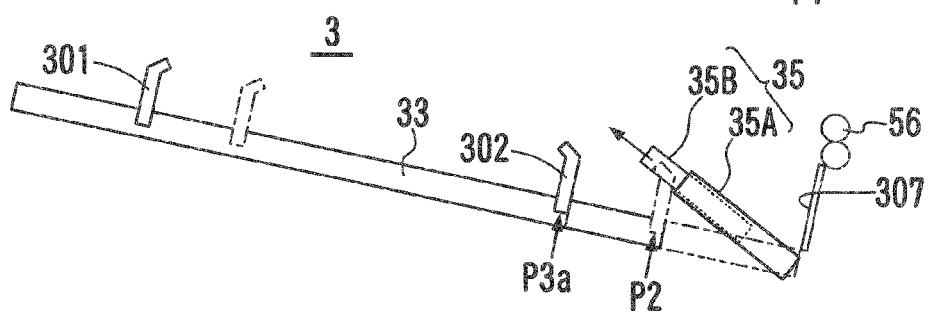
(d) 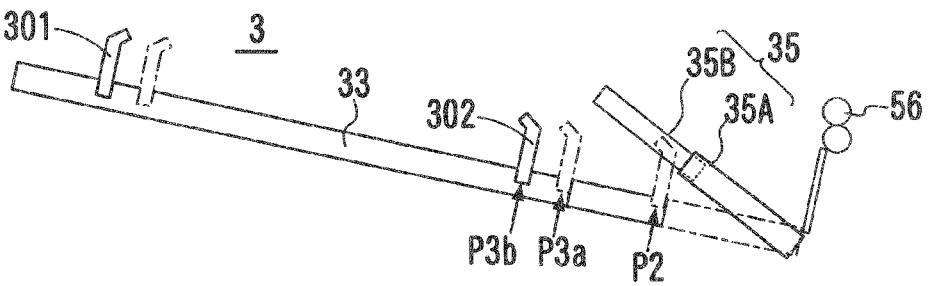
(e) 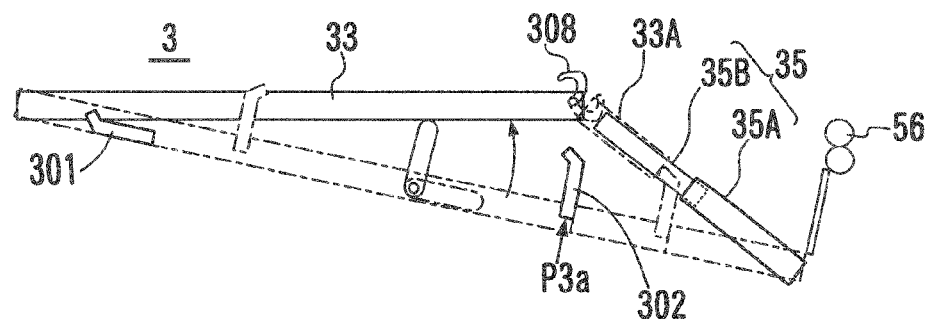

FIG. 9
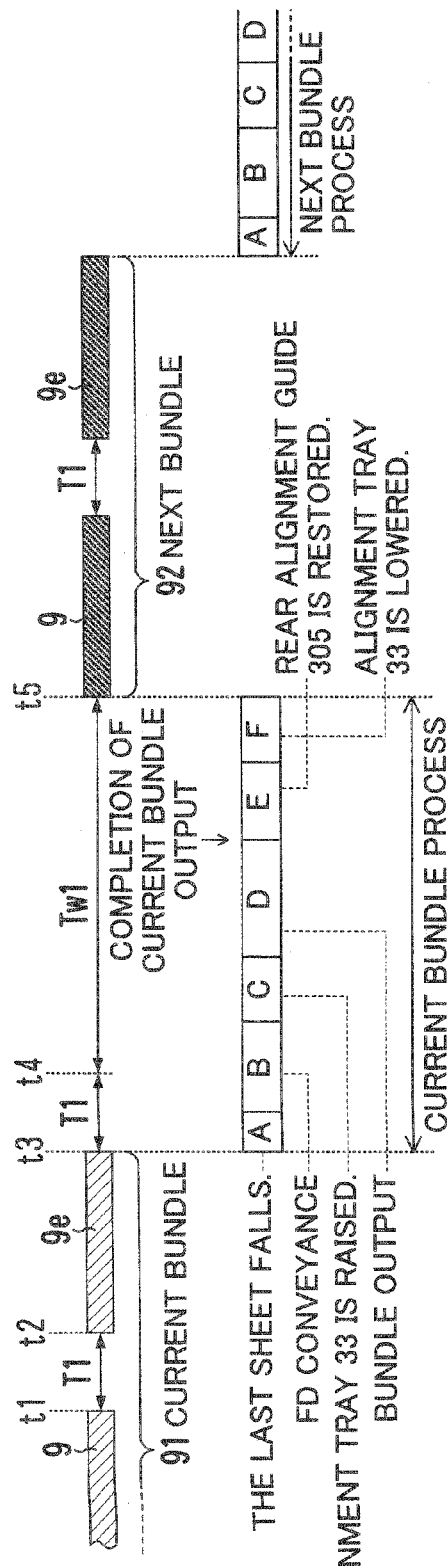
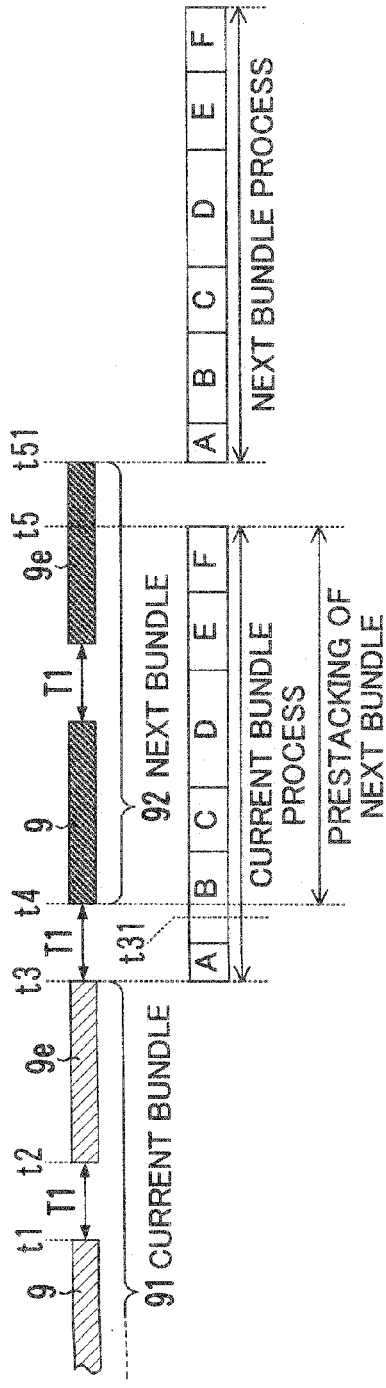

POST-PROCESSING DEVICE AND IMAGE FORMING APPARATUS WITH NORMAL MODE POST PROCESS AND HIGH-SPEED MODE POST PROCESS

This application is based on Japanese patent application No. 2014-146226 filed on Jul. 16, 2014, the contents of which are hereby incorporated by reference.

BACKGROUND OF THE INVENTION

1. Field of the Invention

The present invention relates to a post-processing device for applying a post-process to one or more sheets fed thereinto, and an image forming apparatus.

2. Description of the Related Art

An image forming apparatus for printing an image onto a sheet (paper), e.g., a printer, a copier, or a Multi-functional Peripheral (MFP), is provided with a sheet containing portion in which lots of sheets of paper are loadable and from which the paper is supplied. Such an image forming apparatus carries out printing while supplying the sheets one by one from the sheet containing portion and conveying the sheets.

The image forming apparatus is internally or externally provided with a post-processing device for applying a post-process to a sheet on which an image has been printed. The post-processing device has at least a function to apply a post-process called "alignment process" of aligning stacked sheets of paper. There has been known a post-processing device for applying a post-process such as stapling the sheets that have been subjected to the alignment process, or punching a hole in the sheets that have been subjected to the alignment process.

For execution of a print job, the image forming apparatus timely gives the post-processing device information related to the post-process. For example, before starting to execute the print job, the image forming apparatus informs the post-processing device of the details of settings such as the number of prints, the set of prints, paper size designated by a user, and post-process to be applied (the necessity or lack of necessity of stapling, for example). During execution of the print job, when a sheet is conveyed to a predetermined position on a paper-transfer path from the sheet containing portion for paper feed through a print position to the post-processing device, the image forming apparatus informs the post-processing device of the fact. The post-processing device applies, based on the given information, the post-process to sheets which have been subjected to the print process and are sequentially fed thereinto at an appropriate time synchronously with the paper feed.

A technology related to operation of the post-processing device has been proposed. According to the technology, the speed of operation for discharging a sheet externally from the post-processing device is controlled depending on the sheet size and the number of sheets. This secures the alignment of sheets discharged externally (Japanese Laid-open Patent Publication No. 2007-145528).

Suppose that print jobs are entered one after another into the image forming apparatus. In such a case, while the post-processing device applies a post-process to one or more sheets related to a preceding print job, a sheet related to the next print job sometimes cannot be fed into the post-processing device. This needs sheet conveyance related to a subsequent print job to be delayed in such a manner that the sheet conveyance is started after the post-processing device is ready to receive the sheet related to the next print job. The delay in sheet conveyance lowers the printing productivity of the image forming apparatus.

SUMMARY

The present disclosure has been achieved in light of such an issue, and therefore, an object of an embodiment of the present invention is to improve the productivity of processes by reducing a delay in conveying sheets to the post-processing device due to unfinished process in the post-processing device.

A post-processing device according to an aspect of the present invention is a post-processing device for applying a post-process to one or more sheets outputted by a device of a preceding stage. The post-processing device includes: an alignment mechanism which includes a sheet rest in which one or more sheets outputted by the device of the preceding stage are put, and applies an alignment process for arranging a current sheet bundle which is a sheet bundle of one or more sheets and is put in the sheet rest; an output mechanism configured to output the current sheet bundle that has been subjected to the alignment process by the alignment mechanism outside the sheet rest; a prestacking mechanism configured to perform prestacking of temporarily keeping, in an upstream of the sheet rest, a next sheet bundle which is the sheet bundle which is outputted by the device of the preceding stage before the output mechanism outputs the current sheet bundle, and to put, in the sheet rest, the next sheet bundle that has been subjected to the prestacking after the current sheet bundle is outputted; and a control unit; wherein the control unit performs a control in such a manner that at least a part of operation of the alignment mechanism or of operation of the output mechanism is switched from a normal operation mode for operation at a normal operation speed to a high-speed operation mode for operation at an operation speed greater than the normal operation speed when a time to completely output the current sheet bundle is later than a time to completely perform prestacking the next sheet bundle.

These and other characteristics and objects of the present invention will become more apparent by the following descriptions of preferred embodiments with reference to drawings.

BRIEF DESCRIPTION OF THE DRAWINGS

FIG. 6 is a schematic front view of the structure of the main part of a finisher.

FIG. 9 shows timing charts for depicting an advantageous effect of prestacking.

DESCRIPTION OF THE PREFERRED EMBODIMENTS

In this description, a finisher for applying a post-process to one or more sheets (paper) onto which an image forming apparatus has printed images is taken as an example of a post-processing device according to an embodiment of the present invention.

Figure 1:
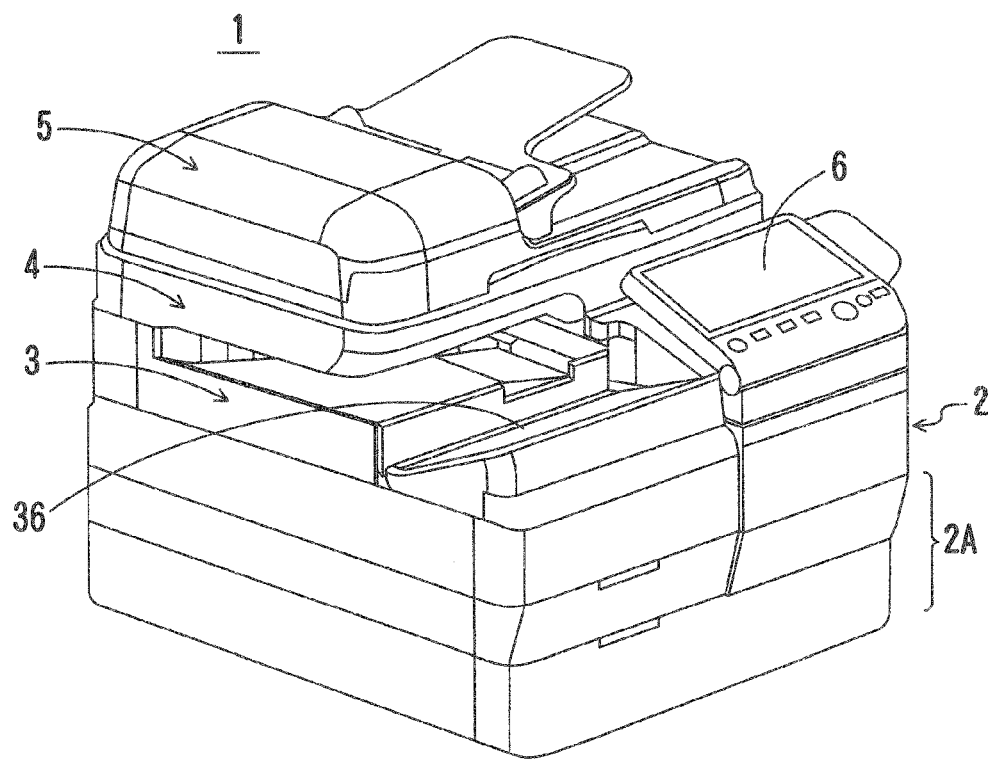
FIG. 1 is a perspective view showing the external view of an image forming apparatus having a finisher according to an embodiment of the present invention.

Referring to FIG. 1, an image forming apparatus 1 is an MFP into which a printer 2 for printing an image onto paper, a finisher 3 for applying a post-process to paper that has been subjected to the print process, and an image scanner 4 for optically reading an image from a document sheet are integrated. A user uses the image forming apparatus 1 as a copier, a printer, a facsimile machine, a network scanner, and so on.

The image forming apparatus 1 is of a compact type in which a paper exit tray 36 is provided on the front of the finisher 3. The finisher 3 is provided on the printer 2. The flatbed image scanner 4 is provided above the finisher 3. There is a space opening to outside between the finisher 3 and the image scanner 4. The printer 2 projects to the front beyond the front end of the image scanner 4. The paper exit tray 36 and an operating panel 6 are provided on the projecting part of the printer 2. The paper exit tray 36 is provided to the left of the image forming apparatus 1 as viewed from the front. The operating panel 6 is provided to the right of the image forming apparatus 1 as viewed from the front.

The printer 2 has a slide-out paper housing portion 2A with a two-stage part for loading thereinto paper used for printing. The image scanner 4 is attached to an Auto Document Feeder (ADF) 5 for feeding a document sheet into a platen glass of the image scanner 4. The operating panel 6 is provided with a touch panel display for displaying a screen and detecting a touch input.

Figure 2:
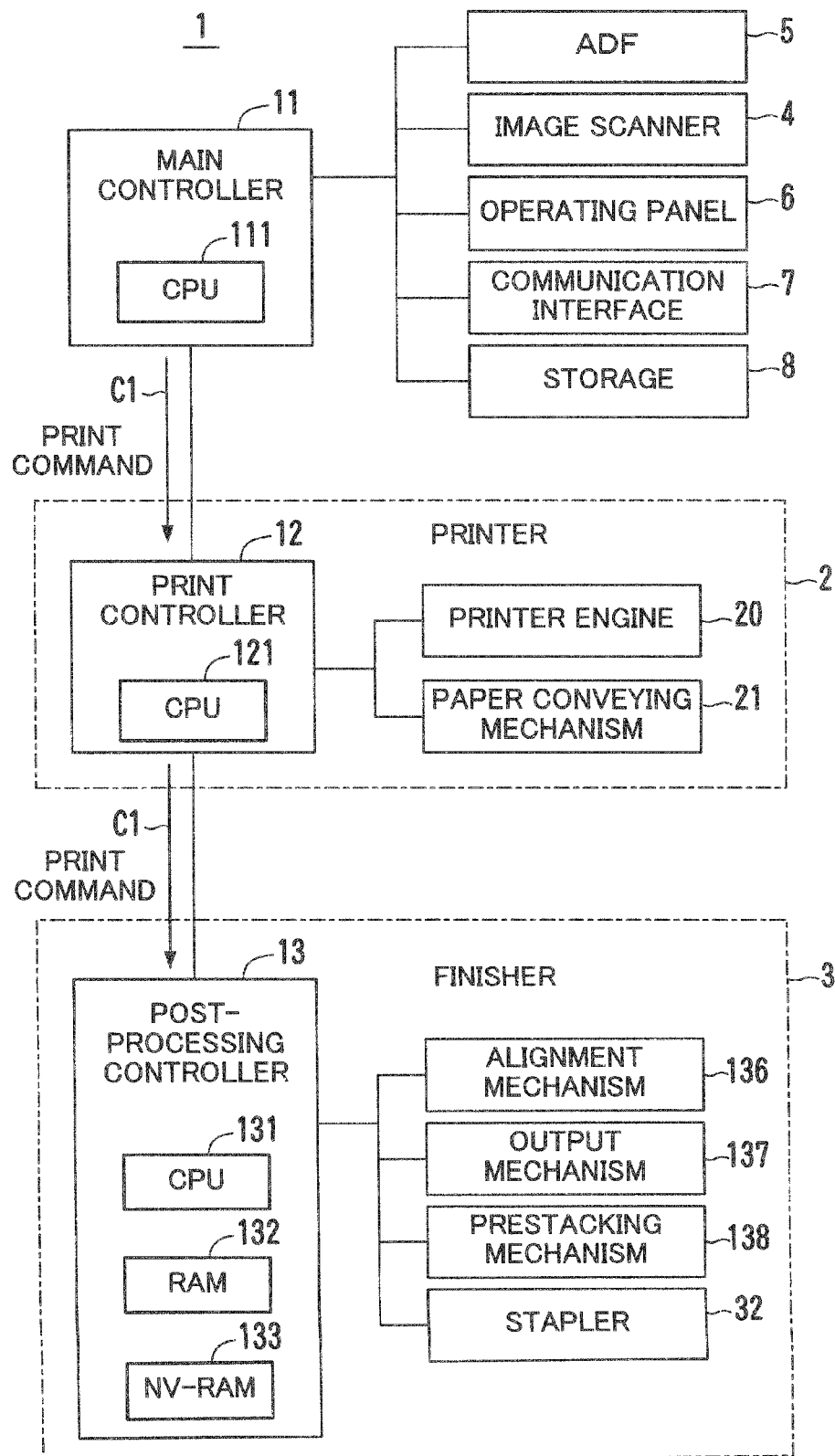
FIG. 2 is a block diagram showing the outline of the hardware configuration of an image forming apparatus.

Referring to FIG. 2, the image forming apparatus 1 has, as control devices, a main controller 11, a print controller 12, and a post-processing controller 13. The controllers 11, 12, and 13 have Central Processing Units (CPUs) 111, 121, and 131, respectively which serve as computers to execute the individual control programs.

The main controller 11 serves to control an overall operation of the image forming apparatus 1. The main controller 11 performs communication with each of the ADF 5, the image scanner 4, the operating panel 6, the communication interface 7, the storage 8, and the print controller 12. The main controller 11 performs communication also with the post-processing controller 13 via the print controller 12 for relaying the communication.

The main controller 11 receives a job entered by a user using the operating panel 6 or entered through access from an external device through the communication interface 7, and gives a command depending on the job to a control target. If the job entered is a job involving printing (print job), e.g., copying, printing, or facsimile reception, then the main controller 11 gives the print controller 12 and the post-processing controller 13 a print command C1 indicating what kind of print job is to be executed next.

The print controller 12 serves to control a printer engine 20 and a paper conveying mechanism 21 of the printer 2. In a print job, the print controller 12 controls the printer 2 to perform print operation in accordance with the print command C1 and a subsequent print start command from the main controller 11. At this time, the print controller 12 gives the post-processing controller 13 information necessary to control the finisher 3, e.g., information on paper size, the number of prints, and the set of prints. The print command C1 and the print start command are examples of a "print command" of the present invention. The print command C1 and the print start command represent a command to print onto a series of sheets of paper per time. The print command C1 and the print start command may be given by the controllers or may be detected by the controllers.

The post-processing controller 13 serves to control an alignment mechanism 136, an output mechanism 137, and a stapler 32 of the finisher 3, and controls the driving of driving members such as a motor, a solenoid, and a clutch provided therein. The post-processing controller 13 and the print controller 12 work in coordination to control the finisher 3 to carry out a series of operation of performing an alignment process on post-printing paper and discharging the paper in accordance with a pace of operation of the printer 2. The post-processing controller 13 is an example of a "control unit" of the present invention. The "control unit" also may be the main controller 11, the print controller 12, or an integrated controller thereof.

The post-processing controller 13 has a Random Access Memory (RAM) 132 and a non-volatile memory 133 in addition to the CPU 131. The non-volatile memory 133 stores therein a program for controlling the finisher 3 and data necessary for control. The program is loaded into the RAM 132 appropriately and is executed by the CPU 131. As with the post-processing controller 13, each of the main controller 11 and the print controller 12 has a RAM, a non-volatile memory, and so on, and stores program and data for control.

The post-processing controller 13 obtains, from the print controller 12, information necessary to control the finisher 3, e.g., the size of paper to be fed into the finisher 3, the progress of paper conveyance, the presence or absence of error. The post-processing controller 13 also responds to an inquiry from the main controller 11 to provide the main controller 11 with information on status of the finisher 3, specifically, information as to whether or not the finisher 3 is ready to receive paper 9.

Figure 3:
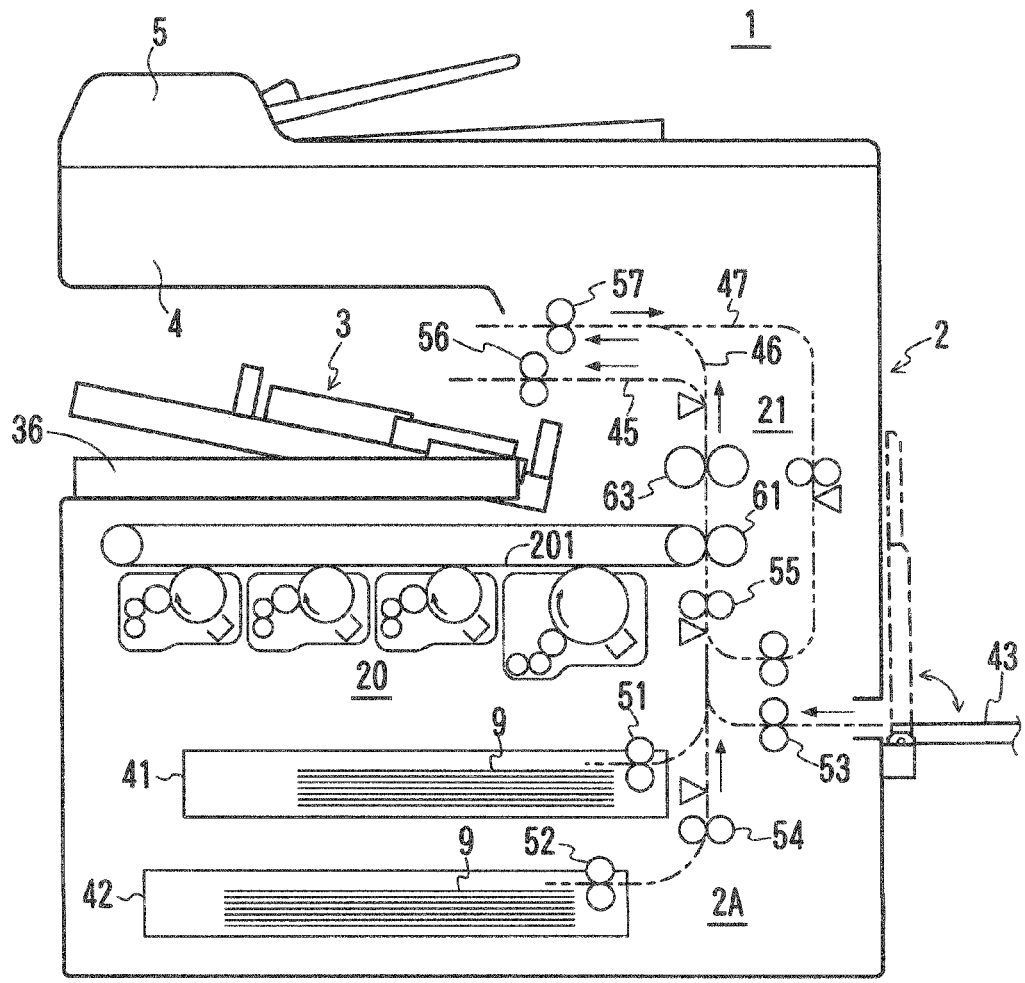
FIG. 3 is a diagram showing the structure of a section for conveying paper in an image forming apparatus.

FIG. 3 is a diagram showing the structure of a section for conveying paper in the image forming apparatus 1. FIG. 3 schematically shows the inner structure of the printer 2 which is a preceding stage of the finisher 3. The dot-dash line and double-dot-and-dash line in FIG. 3 show a transfer path of the paper 9. Herein, the paper 9 is used as a term for calling paper with different sizes collectively.

The printer engine 20 provided below the finisher 3 is operable to print, through electrophotography, a monochrome or color image. The printer engine 20 forms a toner image by a series of electrophotographic processes including charging, exposure, and development, and then primarily transfers the toner image onto the outer surface of an intermediate transfer belt 201.

For color printing, toner images for colors of yellow, magenta, cyan, and black are primarily transferred so as to overlap one another. For monochrome printing, a toner image for black is primarily transferred. The toner image on the intermediate transfer belt 201 is secondarily transferred to the paper 9 conveyed by the paper conveying mechanism 21. The secondary transfer is made at a secondary transfer position where a secondary transfer roller 61 is placed.

The paper conveying mechanism 21 includes different rollers for conveyance, a motor for rotating the rollers, a clutch for intermitting transmission of the rotation, and a solenoid for operating a movable member such as a conveyance switching catch portion. The paper conveying mechanism 21 conveys the paper 9 in the following manner.

The paper 9 is conveyed from one of two paper feed cassettes 41 and 42 of the paper housing portion 2A below the printer engine 20, or, from a movable manual feed tray 43 attached to the outer surface of the housing of the printer 2 to a registration position above the paper housing portion 2A by paper feed rollers 51, 52, and 53, and a paper conveying roller 54. The registration position is a position at which the registration roller 55 for adjusting a conveyance time is placed.

The registration roller 55 sends out the paper 9 upward to the secondary transfer position. The secondary transfer roller 61 sends the paper 9 onto which the toner image has been transferred at the secondary transfer position to a fixing position at which a fixing roller 63 is placed. When the paper 9 passes through the fixing position, the toner image is fixed onto the paper 9 by application of heat and pressure.

For single-sided printing, after passing through the fixing position, the paper 9 is conveyed on a paper feed path 45. The paper 9 is discharged to the finisher 3 by a paper output roller 56.

For duplex printing, the paper 9 which has been subjected to the print process on a first side is conveyed to pass on a paper feed path 46 diverged from the paper feed path 45. The paper 9 is conveyed backward to a duplex printing paper feed path 47 by the reverse rotation roller 57. The paper 9 is then returned to the registration position by a paper feed roller on the duplex printing paper feed path 47. The paper 9 then passes through the secondary transfer position and the fixing position, so that the paper 9 is subjected to the print process on a second side. After that, the paper 9 is conveyed on the paper feed path 45. The paper output roller 56 discharges the paper 9 to the finisher 3.

The finisher 3 outputs the paper 9 to the paper exit tray 36. The user then obtains the paper 9 as a resultant of the print operation by the image forming apparatus 1.

Many of print jobs entered into the image forming apparatus 1 involve using a plurality of sheets of paper 9. Stated differently, the number of prints of many print jobs is a plurality of sheets of paper. For example, for a single-sided print job of printing an image on one side of each of the document sheets, the paper 9 having the same number of sheets as the number of document sheets is used.

When a print job involving using a plurality of sheets of paper 9 is entered, the sheets of paper 9 are fed one after another from the paper housing portion 2A to the secondary transfer position with a predetermined pitch (distance) called an inter-sheet space provided. Thereafter, the printer engine 20 forms a toner image to be secondarily transferred onto each of the sheets of paper 9 at a time when each of the sheets of paper 9 conveyed with the inter-sheet space kept passes through the secondary transfer position. The sheets of paper 9 that have been subjected to the print process are fed one by one into the finisher 3 in a cycle determined based on the length of the paper 9 along the conveyance direction and the inter-sheet space.

The finisher 3 of the image forming apparatus 1 outputs the paper 9 to the paper exit tray 36, basically for each print job. To be specific, for a print job in which the number of prints is 2 or more, the finisher 3 waits for the paper 9 corresponding to the number of prints to be fed thereinto, and then, outputs the paper 9 fed corresponding to the number of prints to the paper exit tray 36 at one time. For a print job in which the number of prints is 1, as soon as one sheet of paper 9 is fed into the finisher 3, the finisher 3 outputs the paper 9 to the paper exit tray 36.

Aside from the case where the finisher 3 outputs the paper 9 for each print job, in some cases, the finisher 3 outputs the paper 9 to the paper exit tray 36 a plurality of times for one print job. To be specific, for a print job in which the set of prints is 2 or more, every time when the paper 9 corresponding to the number of prints of each set is fed into the finisher 3, the finisher 3 outputs the paper 9 to the paper exit tray 36. Even when the set of prints is 1, as long as the number of prints is multiple and exceeds a permissible number for one time output (200 sheets, for example), when the paper 9 corresponding to the permissible number is fed into, the finisher 3 outputs the paper 9 corresponding to the permissible number to the paper exit tray 36.

In this description, an output target to be outputted from the finisher 3 to the paper exit tray 36 at one time is referred to as a "sheet bundle", or, merely, a "bundle". The bundle corresponds to a plurality of sheets of paper 9, or one sheet of paper 9. Whether the bundle includes a plurality of sheets of paper 9 or includes one sheet of paper 9 depends on a print job involving outputting the bundle. For example, for a print job of printing a plurality of pages of a document onto a single side of each sheet of the paper 9, the bundle is a plurality of sheets of paper 9. Alternatively, for a print job of printing one sheet of document onto one sheet of the paper 9, the bundle is one sheet of paper 9.

The finisher 3 of this embodiment applies, as a post-printing process, an alignment process to the paper 9 fed into the finisher 3. The finisher 3 has a mechanism to apply the alignment process. The structure of the finisher 3 is shown in FIGS. 4-7.

Figure 4:
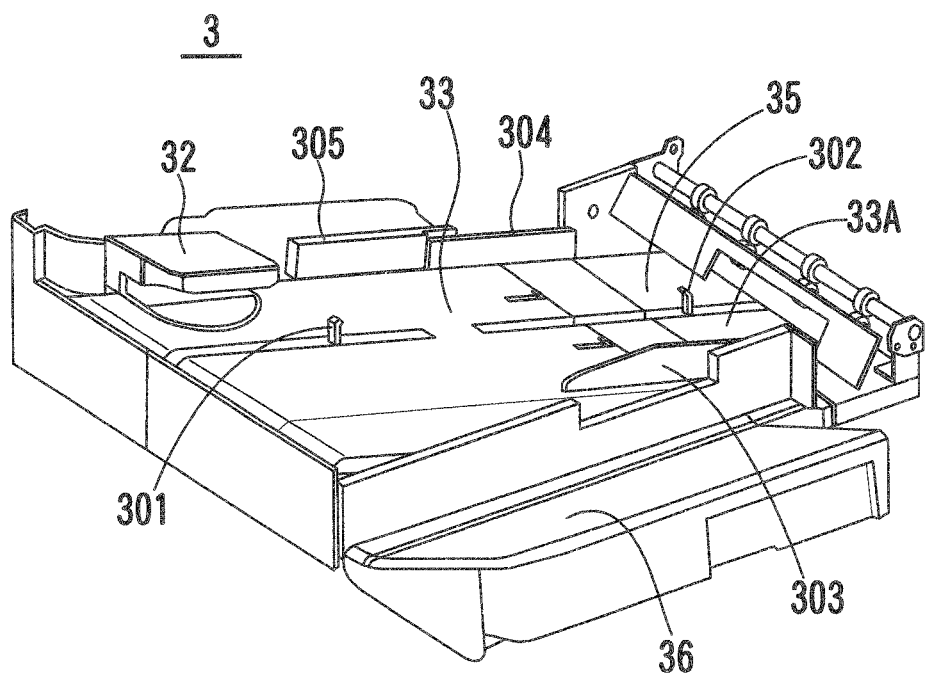
FIG. 4 is a perspective view of the main part of a finisher.
Figure 5:
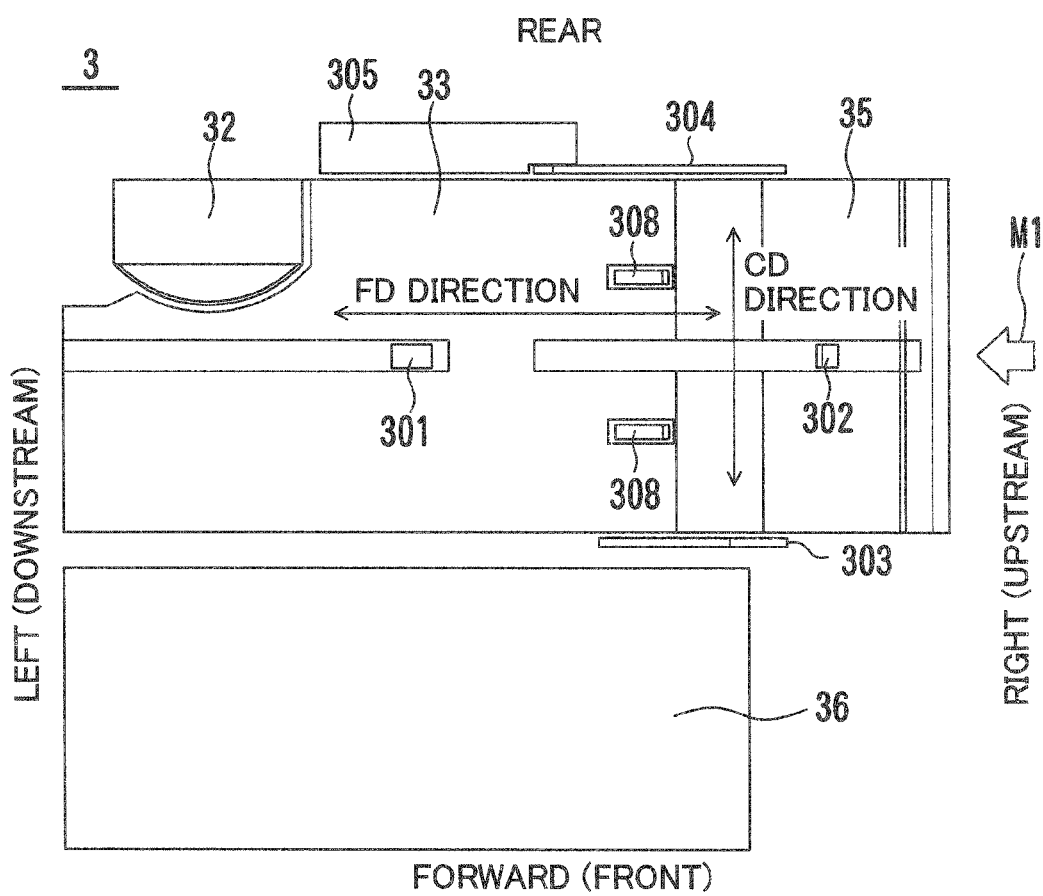
FIG. 5 is a top view of the main part of a finisher.
Figure 7:
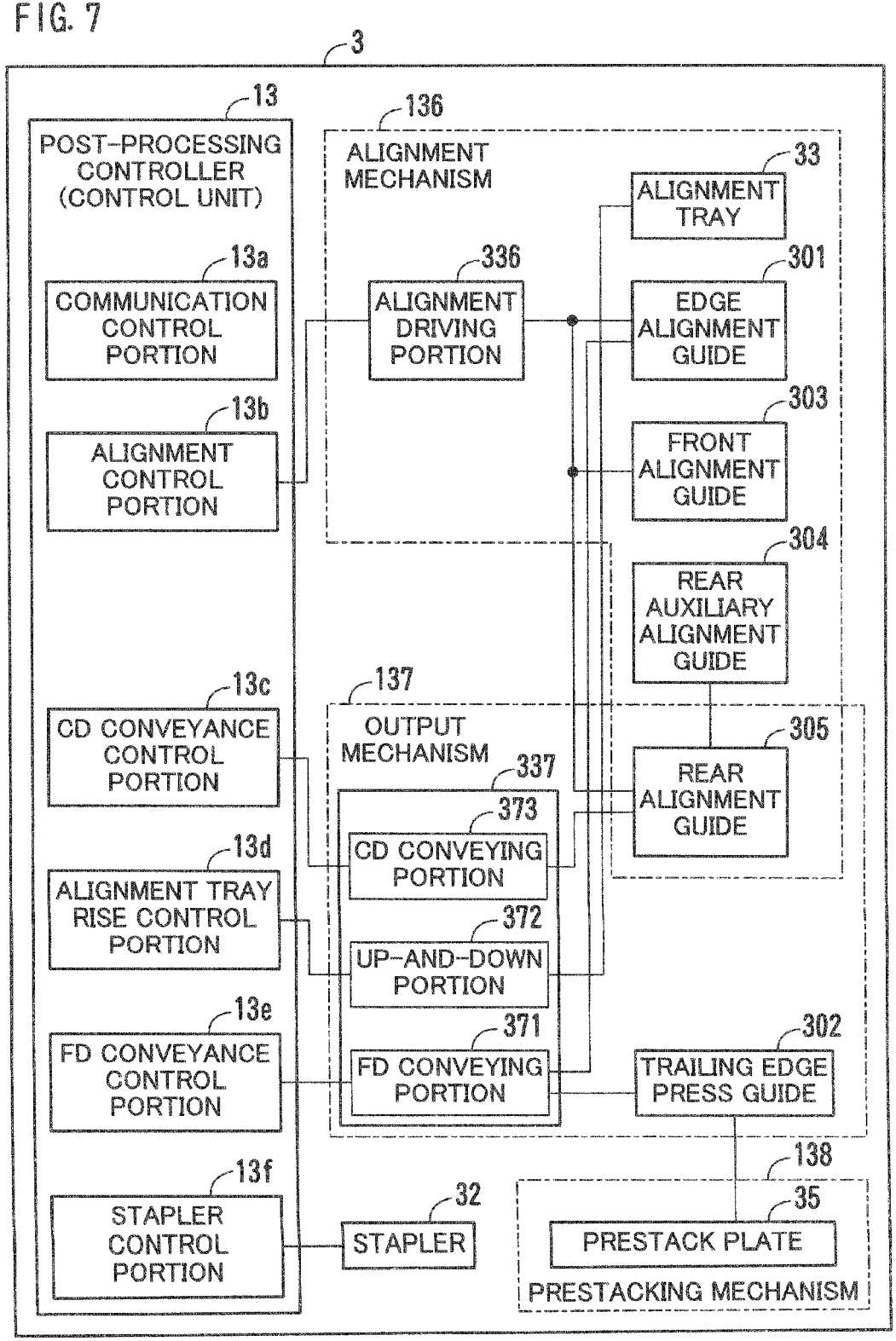
FIG. 7 is a block diagram showing the schematic structure of the entirety of a finisher.

FIG. 4 is a perspective view of the finisher 3 as viewed from the front left. FIG. 5 is a top view of the main part of the finisher 3. FIG. 6 shows, in (a)-(e), a schematic front view of the structure of the main part of the finisher 3. FIG. 7 is a block diagram showing the schematic structure of the entirety of the finisher 3.

As shown in FIGS. 4-6, the finisher 3 includes the stapler 32, an alignment tray 33, a prestack plate 35, an edge alignment guide 301 having a claw shape, a trailing edge press guide 302 having a claw shape, a front alignment guide 303, a rear auxiliary alignment guide 304, a rear alignment guide 305, and a couple of presser guides 308.

The stapler 32 is a unit to perform a stapling process of stapling a bundle aligned in the finisher 3. The stapler 32 is provided on the left back side of the finisher 3.

The alignment tray 33 is a sheet tray with which the paper 9 fed thereinto from the printer 2 is supported. The alignment tray 33 includes a movable part which goes up and down and a fixed part which does not go up and down as described later. When the paper 9 is fed, the upper surfaces of the movable part and the fixed part are arranged to form one plane, which makes the movable part and the fixed part ready to receive the paper 9. However, when the alignment tray 33 moves up, only the movable part is made horizontal and the fixed part further inclines, so that a prestacking mechanism described later is formed. Hereinafter, only the movable part is sometimes referred to as the alignment tray 33. The paper 9 (not shown in FIGS. 4-6) sent out from the printer 2 falls freely on the alignment tray 33. The send-out direction from the printer 2, namely, the feed direction M1 is a direction from right to left of FIG. 5 or FIG. 6.

As shown in FIG. 4 and (a) of FIG. 6, when waiting for the paper 9 to be fed, the alignment tray 33 is so inclined that the upstream (right side) in the feed direction M1 is lower than the downstream (left side). This prevents the paper 9 fallen in the alignment tray 33 from coasting to the downstream, and reduces variation in position of the paper 9 in the feed direction M1. Thereby, the movement distance of the edge alignment guide 301 in the alignment process is minimized.

In a state where the alignment tray 33 is inclined (such a state being referred to as a "lowered state"), the edge alignment guide 301 is used to perform an "alignment operation in the FD direction", and all of the front alignment guide 303, the rear alignment guide 305, and the rear auxiliary alignment guide 304 are used to perform an "alignment operation in the CD direction". As shown in FIG. 5, the FD direction is parallel to the feed direction M1 of the paper 9, and the CD direction is a direction which is along the upper surface of the alignment tray 33 and orthogonal to the FD direction.

The alignment operation in the FD direction is to move the edge alignment guide 301 outside a region in which the paper 9 falls to the upstream of the feed direction M1 in a manner to push the paper 9 so that the trailing edge of the paper 9 contacts the wall surface 307 (see FIG. 6). The alignment operation in the CD direction is to move the front alignment guide 303 and the rear auxiliary alignment guide 304 which are on both sides of the region in which the paper 9 falls in such a manner that a distance between the front alignment guide 303 and the rear auxiliary alignment guide 304 has a length of the paper 9 in the CD direction. At this time, the rear alignment guide 305 is driven to press the rear auxiliary alignment guide 304, so that the rear auxiliary alignment guide 304 moves. Hereinafter, both the alignment operation in the FD direction and the alignment operation in the CD direction are sometimes referred to as an "alignment operation" collectively.

The alignment operation is performed each time the paper 9 is put in the alignment tray 33. The alignment operation is performed also when a bundle (output target one time) has one sheet of paper 9. Then, at the completion of alignment operation one time, the edge alignment guide 301, the front alignment guide 303, the rear alignment guide 305, and the rear auxiliary alignment guide 304 are returned to the individual standby positions, except the last alignment operation for the bundle.

Through the alignment operation, sheets of the paper 9 having the same size are positioned to a common position in the alignment tray 33. Suppose that, for example, a bundle includes three sheets of the paper 9 or more. When the last sheet of paper 9 is about to put in the alignment tray 33, the sheets of paper 9 already put therein are aligned. When the last sheet of paper 9 is put therein and the alignment operation is finished, the alignment process to be performed on the bundle is completed.

When the bundle is outputted to the paper exit tray 36, as shown in (e) of FIG. 6, the lower side (right side) of the alignment tray 33 in the lowered state is raised to make the bundle supporting surface (upper surface) thereof horizontal (such a state being referred to as a "raised state"). When the alignment tray 33 turns into the raised state, the entirety of the bundle supporting surface thereof is higher than the paper exit tray 36, which enables the bundle to be pushed out.

The rear alignment guide 305 is used to output the bundle to the paper exit tray 36. The rear alignment guide 305 moves forward (front surface) from a home position close to the rear (back surface) edge of the alignment tray 33 in the CD direction. This pushes the bundle on the alignment tray 33 to output the bundle to the paper exit tray 36.

The prestack plate 35 is an element of a prestacking mechanism 138 for performing a process called "prestacking". The prestacking is a process to keep the paper 9 fed from the printer 2 waiting in the upstream of the alignment tray 33 during a period when the paper 9 is not allowed to be further put in the alignment tray 33. The period corresponds to a combination of a period during which the bundle is present in the alignment tray 33, and a period from when the bundle is completely outputted to when the alignment tray 33 returns to the lowered state.

A situation where performing prestacking is necessary often occurs. Such a situation is, for example: a situation in which print jobs are entered one after another from a personal computer over a network connected to the image forming apparatus 1; and a situation in which, during execution of a print job, facsimile data is received and a print job of printing the received data is standby. In such a situation, when an active print job is finished, the next print job is executed successively. In a print job of printing a plurality of sets of prints, when paper 9 corresponding to one of the set of prints has not yet been outputted, the paper 9 corresponding to the next set of prints is fed into the finisher 3 in most cases.

During a period when no prestacking is performed, the prestack plate 35 is so placed to make the upper surface thereof and the upper surface of the alignment tray 33 almost level (so called flat) as shown in FIG. 4 and (a) of FIG. 6. The prestack plate 35 in this state (referred to as a "retracted state") does not prevent the movement of the paper 9 from the printer 2 to the alignment tray 33.

On the other hand, during a period when prestacking is performed, the prestack plate 35 is in a state of projecting into a conveyance space to direct the paper 9, moving from the printer 2 to the alignment tray 33, obliquely upward, as shown in (b)-(e) of FIG. 6. Such a state is referred to as an operating state. The details thereof are provided below.

Referring to (a) of FIG. 6, the finisher 3 waits for the paper 9 to be fed from the printer 2. The prestack plate 35 is in the retracted state as described above. The trailing edge press guide 302 is present at a position P1 which is upstream of the wall surface 307. The edge alignment guide 301 is present outside a region where the paper 9 falls. The position of the edge alignment guide 301 is so set, depending on the size of the paper 9, that the movement distance at the time of the FD alignment is minimized without interrupting the fall of the paper 9.

After the bundle is completely fed into the finisher 3, the trailing edge press guide 302 is used to perform operation for moving the bundle to an output standby region in the alignment tray 33. Such an operation is referred to as an "FD conveyance". The trailing edge press guide 302 is moved leftward from the position P1, which pushes the bundle to move the same in the FD direction. At this time, the edge alignment guide 301 also moves with the distance from the trailing edge press guide 302 kept constant.

As the output standby region related to the FD conveyance, two regions are set which are shifted with each other in the FD direction, for example, approximately a few centimeters. Both the two regions are regions where the trailing edge part of the bundle is put in the alignment tray 33. The finisher 3 switches the output standby regions between one of the two regions and the other alternately every time the FD conveyance is performed, namely, for each bundle, in order to carry out shift paper output of shifting, for each output, the position of a printed matter put in the paper exit tray 36.

In the meantime, a transition of the prestack plate 35 from the retracted state to the operating state is carried out in parallel with the FD conveyance.

Referring to (b) of FIG. 6, the prestack plate 35 so pivots as to raise the left end thereof to extend to the conveyance space. The prestack plate 35 starts pivoting when the trailing edge press guide 302 is moved to a position P2 at which the trailing edge press guide 302 does not interrupt the pivot of the prestack plate 35. In the finisher 3 of this embodiment, because of the structural restrictions of the mechanism, after the completion of feeding of a bundle, prestacking of a bundle to be fed next cannot be performed until the trailing edge press guide 302 is moved to the position P2.

FIG. 6 shows, in (c), a state at a time when an FD conveyance of moving the bundle to one output standby region (right region) for shift paper output has just finished. The trailing edge press guide 302 is moved to a position P3a on the trailing edge side of the output standby region.

As seen from the comparison between (b) and (c) of FIG. 6, while the trailing edge press guide 302 moves from the position P2 to the position P3a, an inner part 35B of the prestack plate 35 projects from an outer part 35A, so that the prestack plate 35 is extended.

FIG. 6 shows, in (d), a state at a time when an FD conveyance of moving the bundle to the other output standby region (left region) for shift paper output has just finished. The trailing edge press guide 302 is moved to a position P3b on the trailing edge side of the output standby region. The position P3b lies to the left of the position P3a.

Referring to (e) of FIG. 6, the alignment tray 33 is in the raised state as described above. The alignment tray 33 transitions from the lowered state to the raised state after the completion of the FD conveyance. When the alignment tray 33 turns into the raised state, the prestack plate 35 is in the operating state.

When the alignment tray 33 transitions to the raised state, the presser guide 308 shown in (e) of FIG. 6 presses down the bundle in the alignment tray 33 to prevent the bundle from misaligning.

The finisher 3 has a function to use the prestack plate 35 to carry out prestacking. Therefore, even if paper 9 which has not yet been outputted is present in the finisher 3, the image forming apparatus 1 is configured to feed another paper 9 into the finisher 3 without stopping, printing, and conveying another paper 9. This is because the finisher 3 is configured to receive the paper 9 from the printer 2. The print operation is carried out while the finisher 3 outputs the paper 9. Thereby, as compared to the case where the print operation is stopped during the output of the paper 9, the productivity of outputting a printed matter by the image forming apparatus 1 can be improved.

Referring to FIG. 7, the post-processing controller 13 includes a communication control portion 13a. The communication control portion 13a controls communication between the post-processing controller 13 and the main controller 11, and between the post-processing controller 13 and the print controller 12. The post-processing controller 13 also includes an alignment control portion 13b, a CD conveyance control portion 13c, an alignment tray rise control portion 13d, an FD conveyance control portion 13e, and a stapler control portion 13f. The individual portions work to control the alignment mechanism 136, the output mechanism 137, and the stapler 32.

The alignment mechanism 136 is to apply an alignment process to the paper 9. The alignment mechanism 136 includes the alignment tray 33, the edge alignment guide 301, the front alignment guide 303, the rear auxiliary alignment guide 304, the rear alignment guide 305, and an alignment driving portion 336. The alignment driving portion 336 follows a command from the alignment control portion 13b to drive the edge alignment guide 301, the front alignment guide 303, and the rear alignment guide 305. The rear auxiliary alignment guide 304 is provided in a manner to, when being pressed by the rear alignment guide 305, move forward, and when the press by the rear alignment guide 305 is stopped, to automatically restore to backward by the forces of an urging member.

The output mechanism 137 is to discharge the paper 9 to the paper exit tray 36. The output mechanism 137 includes the rear alignment guide 305, the trailing edge press guide 302, and an output driving portion 337. While the rear alignment guide 305 is a structural element of the output mechanism 137, it is also a structural element of the alignment mechanism 136 as described above.

The output driving portion 337 also includes an FD conveying portion 371, an up-and-down portion 372 functioning as a sheet cassette posture changing portion, and a CD conveying portion 373. In FD conveyance, the FD conveying portion 371 drives the trailing edge press guide 302 in accordance with a command from the FD conveyance control portion 13e. At this time, the FD conveying portion 371 drives the edge alignment guide 301 in such a manner that the edge alignment guide 301 moves with the distance from the trailing edge press guide 302 kept.

The up-and-down portion 372 follows a command from the alignment tray rise control portion 13d to change the posture of the alignment tray 33 between the lowered state and the raised state.

In outputting the bundle, the CD conveying portion 373 follows a command from the CD conveyance control portion 13c to move the rear alignment guide 305 from the rear to the front, and then restores the rear alignment guide 305 to the home position.

With the prestacking mechanism 138, the prestack plate 35 is so structured that, when the trailing edge press guide 302 is driven by the FD conveying portion 371 to move to a predetermined position, the prestack plate 35 pivots to rise mechanically, and the inner part 35B comes out from the outer part 35A to extend to the vicinity of the trailing edge of the outputted paper, and the prestack plate 35 turns into the operating state shown in (e) of FIG. 6. The alignment tray 33 is raised at this time. When the alignment tray 33 turns into the raised state, a connection portion 33A forming the front bottom surface on the right of the alignment tray 33 shown in FIG. 4 changes its position to bend, and extends. Thereby, the connection portion 33A takes the same angle and posture as those of the prestack plate 35 in the operating state, so that the connection portion 33A function as a part of the prestacking mechanism 138 to hold the front part of the paper 9. The prestack plate 35 returns to the original retracted state mechanically when the trailing edge press guide 302 returns to the standby position P1. The connection portion 33A also returns to the original state as the alignment tray 33 is lowered. In this way, with the prestacking mechanism 138, the prestack plate 35 is so operated to be driven indirectly through the mechanism by the FD conveying portion 371.

The structure of the prestacking mechanism 138 is not limited to the exemplified structure. Another configuration is possible. A prestacking driving portion having a motor, solenoid, or clutch may be separately provided, and may perform direct driving and control.

In the case where a stapling mode is selected for a print job, the stapler 32 staples a bundle in accordance with a command from the stapler control portion 13f.

Figure 8:
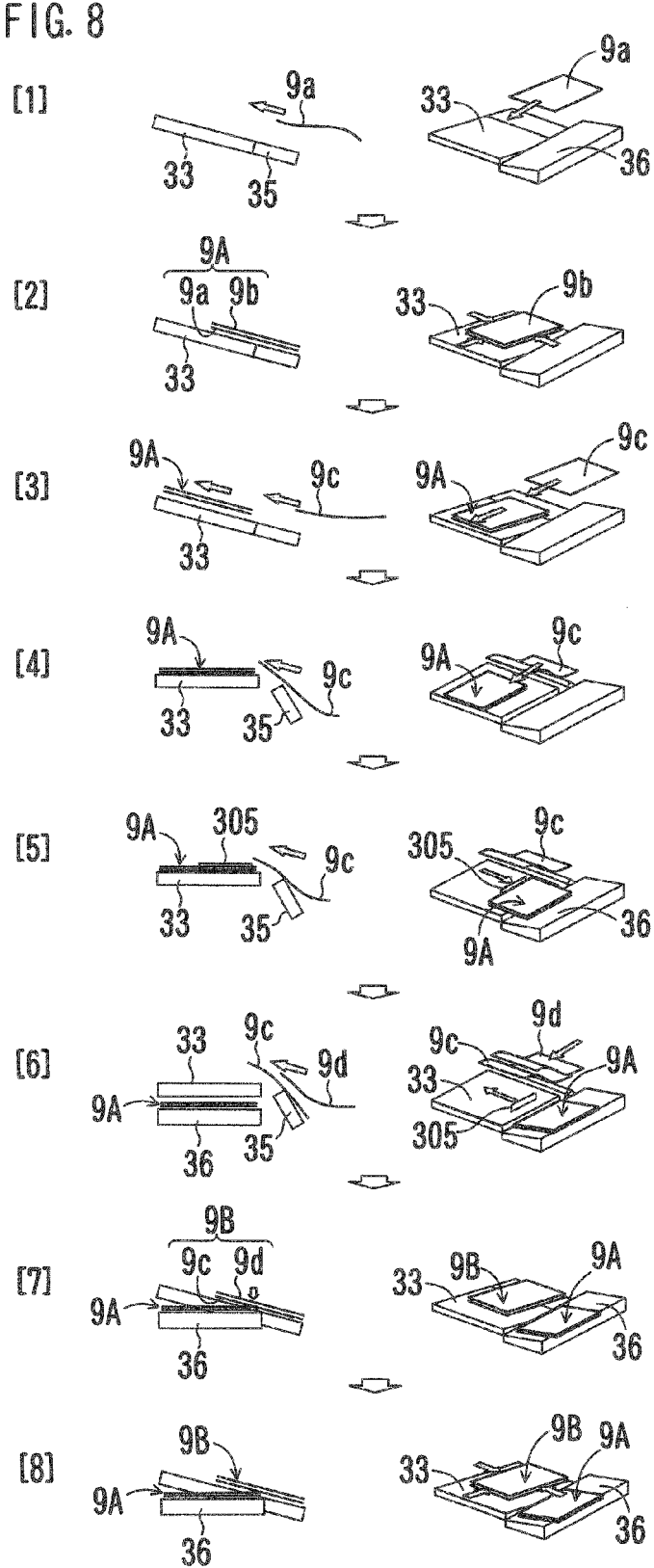
FIG. 8 is a schematic view of the operation of a finisher.

FIG. 8 is a schematic view of the operation of the finisher 3. FIG. 8 takes an example where four sheets of paper 9a, 9b, 9c, and 9d corresponding to two bundles each having two sheets are fed into the finisher 3 one after another. A series of operation including paper output in total twice is separated into stages [1] through [8]. The state of the main part of the finisher 3 in each stage is shown in two diagrams side by side. In each stage, the left diagram is a simplified front view and the right diagram is a simplified perspective view.

Hereinafter, transitioning the alignment tray 33 from the lowered state to the raised state is sometimes referred to as "to raise the alignment tray 33". Transitioning the alignment tray 33 from the raised state to the lowered state is sometimes referred to as "to lower the alignment tray 33".

Further, transitioning the prestack plate 35 from the retracted state to the operating state is sometimes referred to as "to project the prestack plate 35". Transitioning the prestack plate 35 from the operating state to the retracted state is sometimes referred to as "to retract the prestack plate 35".

When the image forming apparatus 1 executes a print job, the finisher 3 performs operation of stages [1] through [8] shown in FIG. 8.

[1] The first sheet of paper 9a of a first bundle is fed from the printer 2 to the standby finisher 3. The fed paper 9a falls freely in the alignment tray 33 which is in the lowered state. At this time, the trailing edge part of the paper 9a is put on the prestack plate 35 which is in the retracted state. When the paper 9a is put in the alignment tray 33, the finisher 3 starts the alignment operation as discussed earlier.

[2] The second sheet of paper 9b of the first bundle is fed from the printer 2 to be put on the first sheet of paper 9a. Thereby, the two sheets of paper 9a and 9b overlap each other to form a bundle 9A. To be more specific, one or more sheets of paper (bundle) which are outputted by a series of printing operation one time by the printer 2 are overlapped with one another in the finisher 3, and the resultant is handled as an actual paper bundle (sheet bundle). In this embodiment, the term "bundle" includes: a state where nothing has yet been printed onto paper; a state where something is printed onto paper and the paper is being conveyed; and a state where printed sheets of paper overlap one another. Therefore, a "bundle" may be put into a "set". The "bundle" or the "set" is one example of the "sheet bundle" of the present invention. The finisher 3 performs the alignment operation.

[3] [Output Preparation #1] After the completion of the alignment operation, or in parallel with the alignment operation, the finisher 3 performs FD conveyance of the bundle 9A which straddles the alignment tray 33 and the prestack plate 35 to the output standby region in a manner to place the entirety of the bundle 9A in the alignment tray 33. At this time, the finisher 3 moves the edge alignment guide 301 and the trailing edge press guide 302 together in such a manner that the bundle 9A is kept sandwiched between the edge alignment guide 301 and the trailing edge press guide 302. This prevents the bundle 9A that has been subjected to the alignment process from misaligning.

During the FD conveyance of the bundle 9A, the first sheet of paper 9c of a second bundle (the third sheet from the beginning of the print job) is fed into the finisher 3. Prestacking is required to prevent the paper 9c from being put on the bundle 9A in the alignment tray 33.

[4] [Output Preparation #2 and Prestacking Start] After the completion of the FD conveyance of the bundle 9A, the finisher 3 raises the alignment tray 33 and projects the prestack plate 35. If the end of the paper 9c extends beyond the prestack plate 35 to contact the bundle 9A, the leading edge of the paper 9c also goes up as the alignment tray 33 is raised.

[5] [Output] After the alignment tray 33 turns into the raised state and the output preparation is made, the finisher 3 moves the rear alignment guide 305 from the rear side to the front side, so that the bundle 9A is pushed to the paper exit tray 36.

[6] [Feeding Preparation #1] After the completion of the output of the bundle 9A, the finisher 3 moves the rear alignment guide 305 from the front side to the rear side to restore the rear alignment guide 305 to the home position. The second sheet of paper 9d (the fourth sheet of paper from the beginning of the print job) of the second bundle which is fed during the movement of the rear alignment guide 305 is placed on the paper 9c supported on the prestack plate 35 in the operating state.

[7] [Feeding Preparation #2] After the rear alignment guide 305 is restored to the home position, the finisher 3 lowers the alignment tray 33, and in parallel with this operation, retracts the prestack plate 35. When the prestack plate 35 turns into the retracted state, the paper 9c and the paper 9d supported on the prestack plate 35 are put in the alignment tray 33. A second bundle 9B obtained in this manner straddles the alignment tray 33 and the prestack plate 35, as with the bundle 9A in the stage [2].

[8] The finisher 3 performs the alignment operation in the same manner as that in the stage [2]. To be specific, the finisher 3 performs an alignment process on the bundle 9B. The finisher 3 then performs operation in the same manner as that in the stages [3] through [7], and outputs the bundle 9B to the paper exit tray 36.

The description goes on to switching speed of such operation.

The finisher 3 has a normal mode (normal operation mode) in which a series of operation (output preparation, output, and feeding preparation) after the feeding of the last sheet of paper 9 of the bundle is performed at a normal speed; and a high-speed mode (high-speed operation mode) in which at least a part of the series of operation is performed at a speed greater than the normal speed. The finisher 3 performs operation switching between the normal mode and the high-speed mode.

In view of the productivity of the post-processing, the high-speed mode is more advantageous than the normal mode. However, the high-speed mode may impair the alignment (matching) of the bundle due to the increase in operational speed. In short, in view of the quality of the alignment process, the normal mode is more advantageous than the high-speed mode.

To address this, the finisher 3 selects the high-speed mode in the case where "the finisher 3 is not ready to receive a bundle, which inevitably delays the conveyance of the paper 9 by the printer 2". Stated differently, the finisher 3 increases the operational speed for the case where the printing productivity by the image forming apparatus 1 decreases because the series of operation by the finisher 3 are not finished.

FIG. 9 shows timing charts for depicting an advantageous effect of prestacking. FIG. 9 shows, in (a), a conveyance interval between bundles for the case of no prestacking. FIG. 9 shows, in (b), a conveyance interval between bundles for the case of prestacking.

With reference to FIG. 9, the meanings of terms related to the following description are clarified herein.

The term "current bundle" is, among any number of "bundles" fed one after another from the printer 2 into the finisher 3, a bundle first fed into the finisher 3. The "current bundle" is therefore a bundle to which the finisher 3 is applying an alignment process, or, is a bundle which is being fed for the alignment process. While the number of sheets of the current bundle 91 is two or more in the example of FIG. 9, it may be one. In FIG. 9, a sheet of paper 9e fed last of the current bundle 91 (such a sheet being referred to as the last sheet of paper) and a sheet of paper 9 which is fed immediately before the sheet of paper 9e are exemplified. The alphabet "e" of the reference numeral of the sheet of paper 9e means that that sheet of paper 9e is the last sheet of paper 9 of the current bundle or another bundle.

The term "next bundle" is the second bundle fed into the finisher 3 next to the "current bundle". In the illustrated example, a next bundle 92 includes two sheets of paper 9 and 9e. However, the number of sheets of the next bundle 92 may be one, or three or more.

Figure 14:
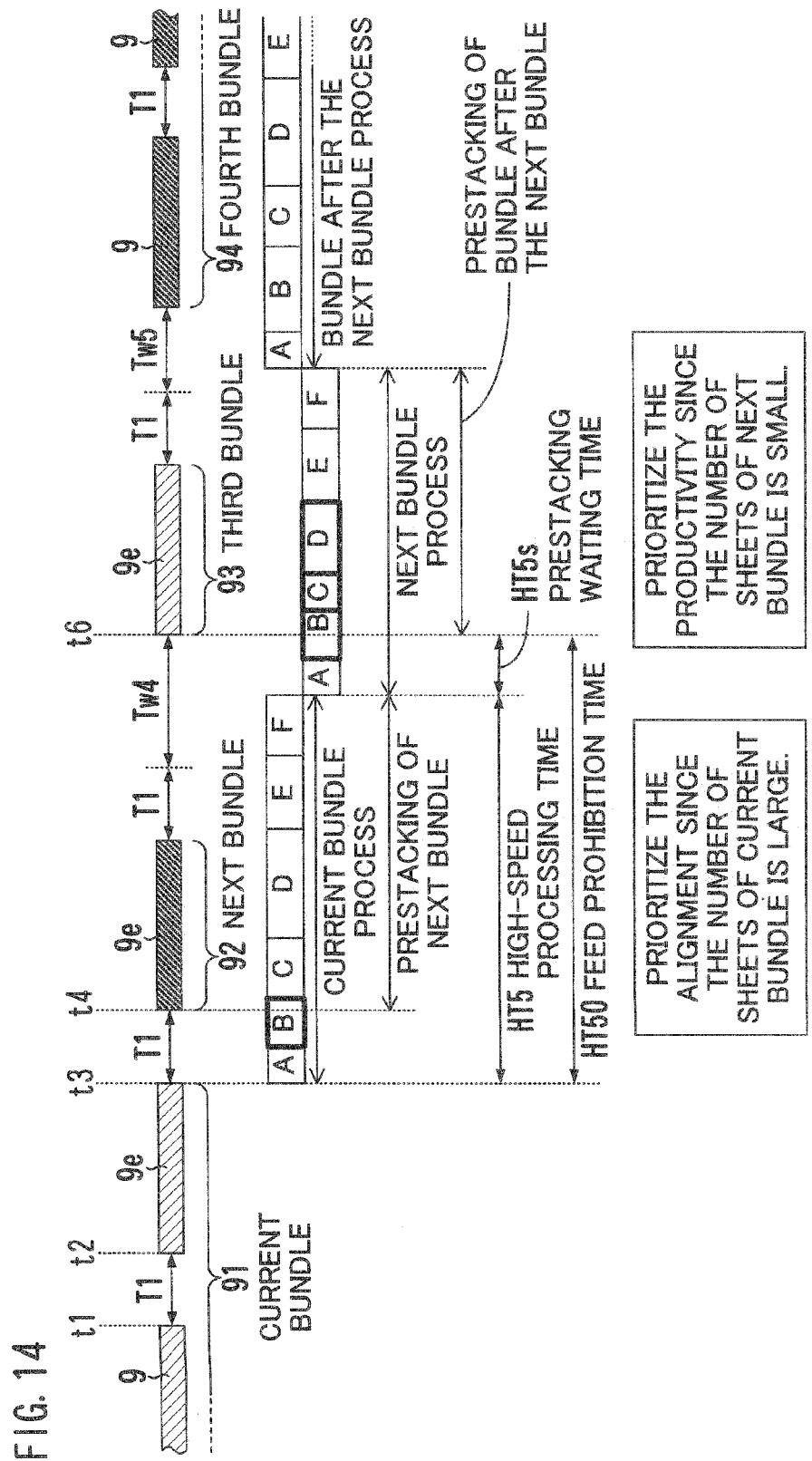
FIG. 14 is a timing chart showing an example in which a stage for speeding up is different between a bundle and another bundle.

The term "bundle after the next bundle" exemplified as a third bundle 93 in FIGS. 10-12 and 14 is the third bundle fed into the finisher 3 next to the "next bundle". The term "bundle after the bundle after the next bundle" exemplified as a fourth bundle 94 in FIG. 14 is the fourth bundle fed into the finisher 3 next to the "bundle after the next bundle". Each of the number of sheets of the "bundle after the next bundle" and the number of sheets of the "bundle after the bundle after the next bundle" may be one, or two or more.

The term "current bundle process" is a series of processes to be carried out by the finisher 3 during a period after the completion of feeding of the last sheet of paper 9e of the current bundle until the completion of feeding of the last sheet of paper 9e of the next bundle. The term "next bundle process" is a series of processes to be carried out by the finisher 3 during a period after the completion of feeding of the last sheet of paper 9e of the next bundle until the completion of feeding of the last sheet of paper 9e of the bundle after the next bundle. The meaning of "completion of feeding of the paper 9, 9e" related to the definition is that the trailing edge of the paper 9, 9e sent out by the paper output roller 56 of the printer 2 leaves the paper output roller 56. The time point at which the paper 9, 9e is completely fed into the finisher 3 corresponds to the time point at which the paper 9, 9e starts falling freely in the alignment tray 33.

Each of the "current bundle process" and the "next bundle process" is divided into six stages of A, B, C, D, E, and F.

In the A-stage, the finisher 3 waits for the last sheet of paper 9e completely fed thereinto to finish falling. The finisher 3 does not operate in the A-stage as seen from the outside.

In the B-stage, FD conveyance for moving the bundle to the output standby region is performed (output preparation #1). When prestacking is made, a process for projecting the prestack plate 35 is performed in parallel with the FD conveyance in the B-stage.

In the C-stage, the alignment tray 33 is raised (output preparation #2).

In the D-stage, the bundle is pushed out from the alignment tray 33 to the paper exit tray 36 (output).

In the E-stage, the rear alignment guide 305 used for outputting the bundle is restored to the home position (feeding preparation #1).

In the F-stage, the alignment tray 33 is lowered (feeding preparation #2). When prestacking is made, a process for retracting the prestack plate 35 is performed in parallel with lowering the alignment tray 33 in the F-stage.

Referring to (a) of FIG. 9, a time at which the image forming apparatus 1 conveys the current bundle 91 and the next bundle 92 is described. It is assumed that, in the description of the conveyance time, print jobs corresponding to a plurality of bundles including the current bundle 91 and the next bundle 92 conveyed by the printer 2 are different from one another. However, actually, two bundles or more probably correspond to one print job as is the aforementioned case of a plurality of sets of prints.

When print jobs are entered one after another, the image forming apparatus 1 executes the print jobs, for example, in the order that the print jobs are entered. In executing each of the print jobs, the main controller 11 checks that the printer 2 and the finisher 3 are completely at the ready. After that, the main controller 11 instructs the printer 2 to start the electrophotographic process and the supply of paper, and notifies the finisher 3 that the instructions have been given.

In response to the instructions, the printer 2 starts conveying a bundle (at least one sheet of paper 9) from the paper housing portion 2A to the paper output roller 56. The printer 2 performs the bundle conveyance process which starts from the send-out to the secondary transfer position by the registration roller 55, to the output to the finisher 3 by the paper output roller 56 at a velocity (V) equal to a circumferential velocity (system speed) of the movement of the intermediate transfer belt 201.

Immediately before the paper output roller 56 starts outputting the bundle, the print controller 12 using the paper sensor to monitor the location of the bundle currently conveyed notifies the post-processing controller 13 that outputting the bundle starts shortly. The post-processing controller 13 specifies the time point at which the bundle is completely fed based on the notification and bundle-related information given in advance by the main controller 11 (the number of sheets and paper size). As the specified time point is reached, the post-processing controller 13 controls the finisher 3 to perform the process of the six stages from the A-stage through the F-stage.

In (a) and (b) of FIG. 9, time points t1, t2, t3, and t4 are as follows.

t1: A time point at which conveyance of a sheet of paper 9 which is the immediately preceding sheet of the last sheet of paper 9e of the current bundle 91 is completed.

t2: A time point at which feeding of the last sheet of paper 9e of the current bundle 91 is started.

t3: A time point at which feeding of the current bundle 91 is completed.

t4: A time point at which time T1 has elapsed since the time point t3.

The time T1 is a conveyance time corresponding to a lower limit (minimum necessary value) of a gap between sheets (inter-sheet space) provided for the case where a plurality of sheets of paper 9 is conveyed sequentially. The time T1 is expressed by $T1=Dd/V$ wherein Dd represents the lower limit of the inter-sheet space and V represents the system speed.

The time T1 is always constant irrespective of the paper size. In contrast, a time between the time point t2 and the time point t3 varies depending on the paper size of the paper 9e. As the length of the paper 9e in the conveyance direction is longer, the time between the time point t2 and the time point t3 is also longer.

Since no prestacking is performed in the example of (a) of FIG. 9, feeding the next bundle 92 into the finisher 3 is not permitted until the current bundle process starting from the time point t3 is finished. If the next bundle 92 is fed into the finisher 3 during the current bundle process, a sheet of paper 9 of the next bundle 92 is probably put on the current bundle 91 which is being outputted, or, the rear alignment guide 305 which is being restored probably pushes the sheet of paper 9 of the next bundle 92 to be bent.

To address this, when no prestacking is performed, in order to execute a print job corresponding to the next bundle 92, it is necessary for the printer 2 to start conveying the next bundle 92 in such a manner that feeding of the next bundle 92 starts after the time point t5 at which the current bundle process is finished. In other words, it is necessary to delay the start of the conveyance of the next bundle 92 by at least a time (wait) Tw1 from the time point t4 to the time point t5. Delaying the start of the conveyance inevitably delays completion of the print job.

In contrast, since prestacking is performed in the example of (b) of FIG. 9, feeding the next bundle 92 into the finisher 3 may be started before the time point t5 at which the current bundle process is finished. Stated differently, as long as the necessary minimum inter-sheet space is provided between the last sheet of paper 9e of the current bundle 91 and the next bundle 92, the printer 2 may start conveying the next bundle 92 in such a manner that the next bundle 92 is fed into the finisher 3, following the current bundle 91. In the case of (b) of FIG. 9, the time point t4 is a time point at which feeding of the next bundle 92 is started.

As described earlier with reference to (b) of FIG. 6, a time point t31 between the time point t3 and the time point t4 is a time point at which the trailing edge press guide 302 during the FD conveyance moves to a position P2. To be specific, the time point t31 is a time point at which projecting the prestack plate 35 is possible.

As seen from the comparison between (a) and (b) of FIG. 9, the prestacking renders a wait Tw1 unnecessary. The prestacking also enables a time to convey the next bundle 92 to be set to the fastest time (called "rate-controlling") at which an inter-sheet space from the current bundle 91 which is a preceding bundle is the necessary minimum. In the rate-controlling, the wait Tw1 becomes unnecessary, and therefore a time point t51 at which a process for the next bundle starts is advanced accordingly.

Figure 10:
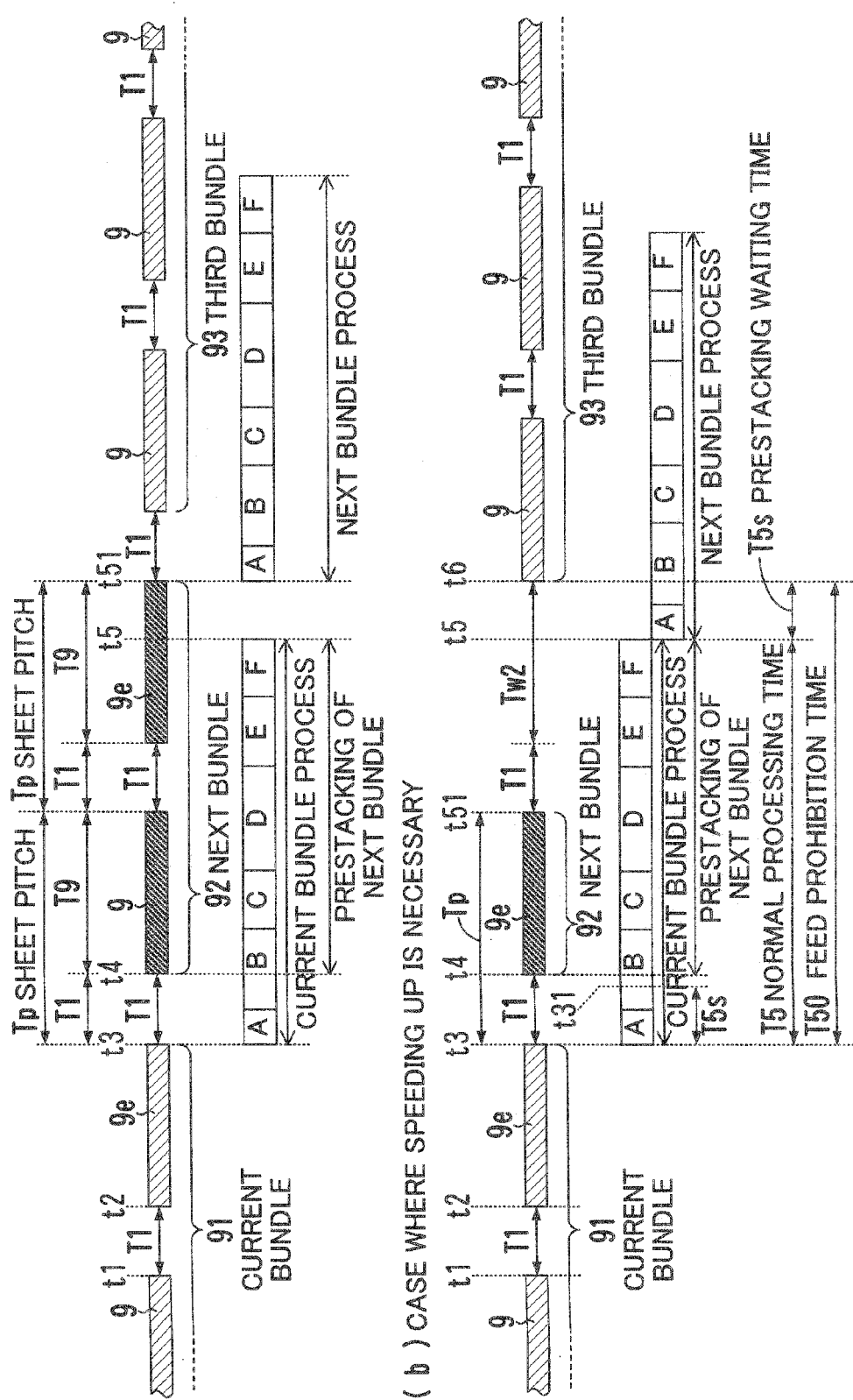
FIG. 10 shows timing charts for depicting the necessity or lack of necessity of speeding up of operation by a finisher.

FIG. 10 shows timing charts for depicting the necessity or lack of necessity of speeding up of operation by the finisher 3. FIG. 10 shows, in (a), a case where the speeding up is not necessary, and shows, in (b), a case where the speeding up is necessary.

When the image forming apparatus 1 executes a print job corresponding to the next bundle 92, and subsequently executes a print job corresponding to the third bundle 93, the operation by the finisher 3 is speeded up as needed.

As shown in (a) and (b) of FIG. 10, in parallel with the current bundle process, the next bundle 92 is fed into the finisher 3. Since prestacking is performed at this time, a time to convey the next bundle 92 is the rate-controlling.

The number of sheets of the next bundle 92 is two in (a) of FIG. 10. Referring to (a) of FIG. 10, the time point t51 at completion of feeding of the next bundle 92 into the finisher 3 is later than the time point t5 at finish of the current bundle process. In such a case, since the time to convey the third bundle 93 may be set to the rate-controlling, the speeding up of the current bundle operation is not necessary. The time point t5 is an example of a "time to completely output the current sheet bundle" of the present invention. The time point t51 is an example of a "time to completely perform prestacking the next sheet bundle" of the preset invention.

In contrast, the number of sheets of the next bundle 92 is one in (b) of FIG. 10. Referring to (b) of FIG. 10, the time point t51 at completion of feeding of the next bundle 92 into the finisher 3 is earlier than the time point t5 at finish of the current bundle process. In such a case, the time to convey the third bundle 93 cannot be set to the rate-controlling. Stated differently, it is necessary to provide a wait Tw2 to delay the time point t6 at which feeding of the third bundle 93 into the finisher 3 starts. Speeding up the current bundle process is necessary to shorten the wait Tw2 to improve the printing productivity.

As discussed above, whether speeding up the current bundle process is necessary or not, in other words, whether the time t5 is later than the time t51 or not, depends on the number of sheets of the next bundle 92 and the paper size. To be specific, if the product of a sheet pitch Tp of the next bundle 92 and the number of sheets of the next bundle 92 is smaller than a feed prohibition time T50 shown in (b) of FIG. 10, then speeding up the current bundle process is necessary. If the product is greater than the feed prohibition time T50, then speeding up the current bundle process is not necessary.

The sheet pitch Tp is the sum of a conveyance time T9 of the paper 9, 9e in the conveyance direction and the time T1 (conveyance time for the necessary minimum inter-sheet space). The sheet pitch Tp depends on the length of the paper 9, 9e in the conveyance direction.

The feed prohibition time T50 is the sum of a normal processing time T5 which is a time required for the current bundle process to be performed in the normal mode and a prestacking waiting time T5s in the normal mode. The feed prohibition time T50 is a time from when operation for outputting the current bundle is started to when prestacking of the next bundle is enabled. The prestacking waiting time T5s is the sum of a time required for the A-stage and a time for the trailing edge press guide 302 to move from the position P1 to the position P2 in the B-stage.

In this embodiment, if the number of sheets (N) of the next bundle 92 is smaller than a predetermined threshold (Nth), then the post-processing controller 13 determines that the time t5 is later than the time t51. At this time, the threshold (Nth) is a value obtained by dividing the feed prohibition time T50 by the sheet pitch Tp to round up the resultant to become an integer. In the illustrated example of FIG. 10, the threshold (Nth) is 2. The threshold (Nth) is an example of a "predetermined number of sheets" of the present invention.

Figure 11:
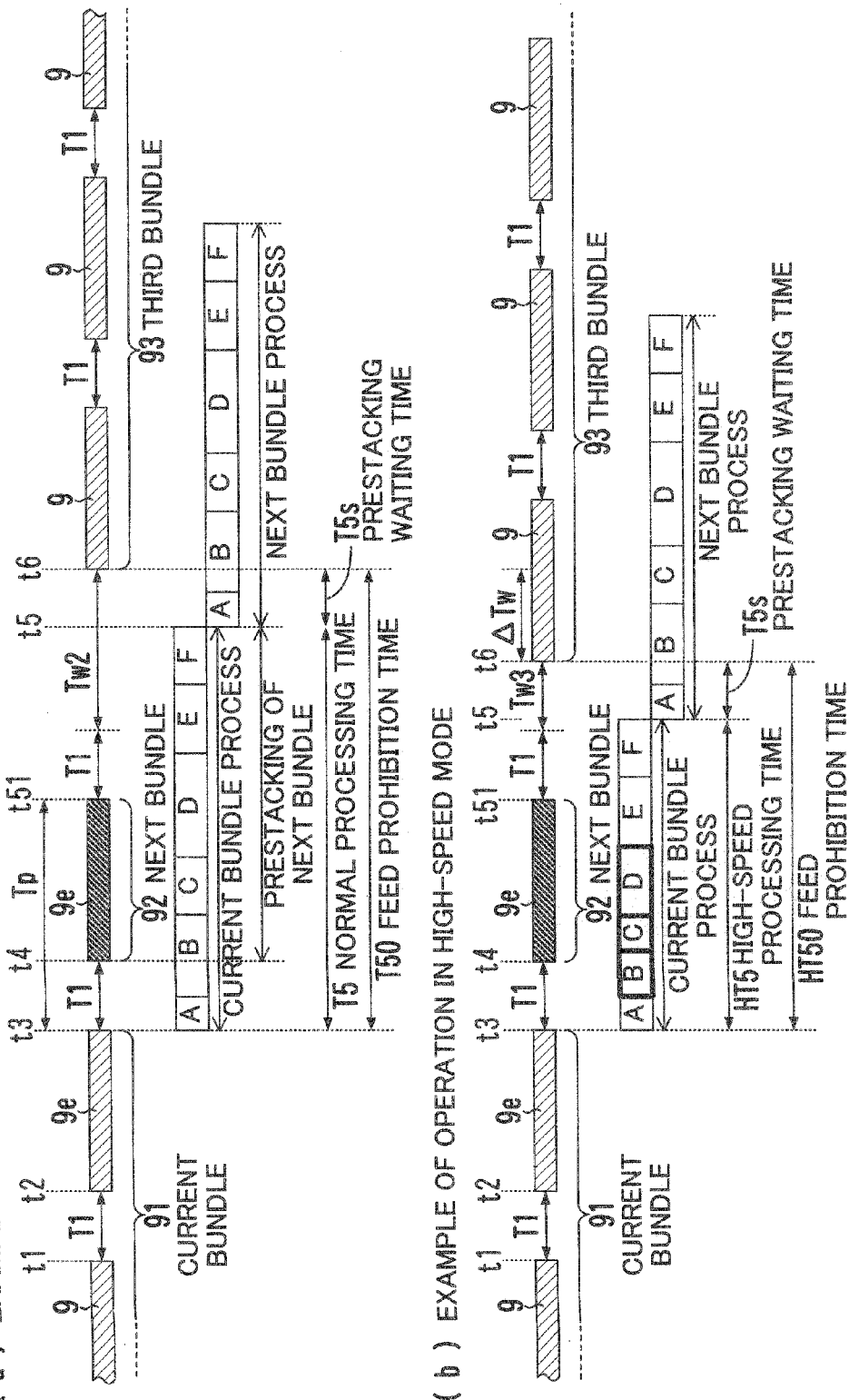
FIG. 11 shows timing charts for depicting an advantageous effect of speeding up of operation by a finisher.

FIG. 11 shows timing charts for depicting an advantageous effect of speeding up of operation by the finisher 3. FIG. 11 shows, in (a), an example of operation in the normal mode, and shows, in (b), an example of operation in the high-speed mode.

The timing chart of (a) of FIG. 11 is the same as that of (b) of FIG. 10. As described earlier, the time point t6 at which feeding of the third bundle 93 into the finisher 3 starts is a time point at which the time T1 and the wait Tw2 have elapsed since the time point t51.

In (b) of FIG. 11, out of the six stages from the A-stage through the F-stage in the current bundle process, three stages of the B-stage through the D-stage indicated by the thick line are speeded up. To be specific, the processes in the B-stage (FD conveyance), the C-stage (raising the alignment tray 33), and the D-stage (output) are carried out at a velocity greater than that in the normal mode.

The reason why not to speed up the A-stage is that the A-stage is to wait for the paper 9 to fall freely, and, in the A-stage, the finisher 3 has to be standstill during a predetermined time necessary for the paper 9 to fall. The reason why not to speed up the E-stage and the F-stage is that since no paper 9 is put in the alignment tray 33 in the E-stage and the F-stage, the matching of the bundle is not deteriorated, and the velocity in the normal mode is set to almost the maximum value; therefore room for increasing the speed is little.

As is evident from the comparison between (a) and (b) of FIG. 11, by speeding-up, a high-speed processing time HT5 which is required for the current bundle process to be performed in the high-speed mode becomes shorter than a normal processing time T5 which is required for the current bundle process to be performed in the normal mode. A feed prohibition time HT50 in the high-speed mode becomes shorter than the feed prohibition time T50 in the normal mode by a length corresponding to the shortened high-speed processing time HT5.

Stated differently, by speeding-up, a wait Tw3 related to the conveyance of the third bundle 93 becomes shorter than a wait Tw2 in the normal mode. In other words, speeding up the current bundle process expedites the start of the print job corresponding to the third bundle 93 by a length corresponding to the difference ΔTw between the wait Tw3 and the wait Tw2.

Figure 12:
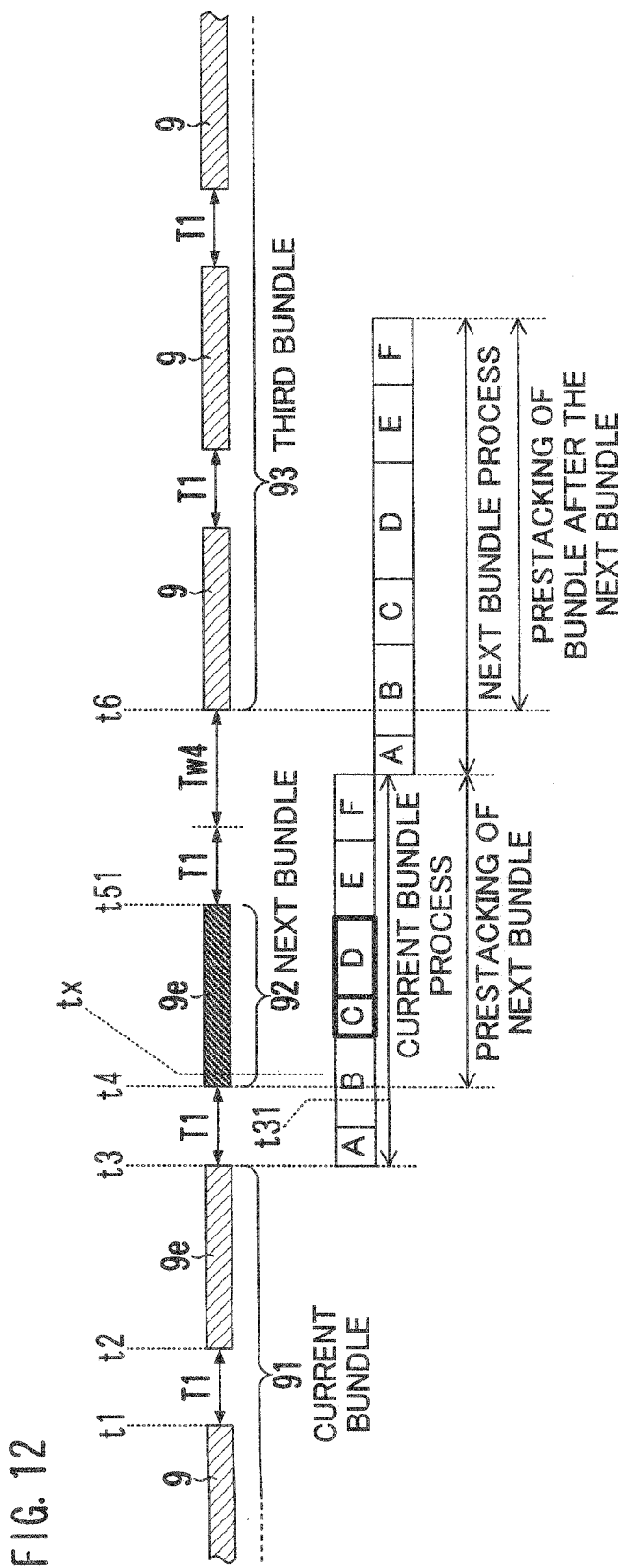
FIG. 12 is a timing chart for depicting the truth that a stage where operation of a finisher is speeded up depends on a time at which the necessity or lack of necessity of speeding up is determined.

FIG. 12 is a timing chart for depicting the truth that a stage where operation of the finisher 3 is speeded up depends on a time at which the necessity or lack of necessity of speeding up is determined.

Referring to FIG. 12, two stages of the C-stage and the D-stage of the current bundle process are speeded up. In such a case, a wait Tw4 related to the conveyance of the third bundle 93 is longer than the wait Tw3 for the case of speeding up the three stages as shown in (b) of FIG. 11. The wait Tw4 is, however, shorter than the wait Tw2 in the normal mode shown in (a) of FIG. 11. Speeding up the two stages is also effective to shorten a delay in a print job.

In the example of FIG. 12, the reason why not to speed up the B-stage is that a time point tx at which a time to convey the third bundle 93 is determined is a time point during the processing of the B-stage. When it is determined that speeding up is necessary and the processing of the B-stage already starts at the time point tx to determine the length of a wait, a stage which can be speeded up is limited to the C-stage and beyond.

Figure 13:
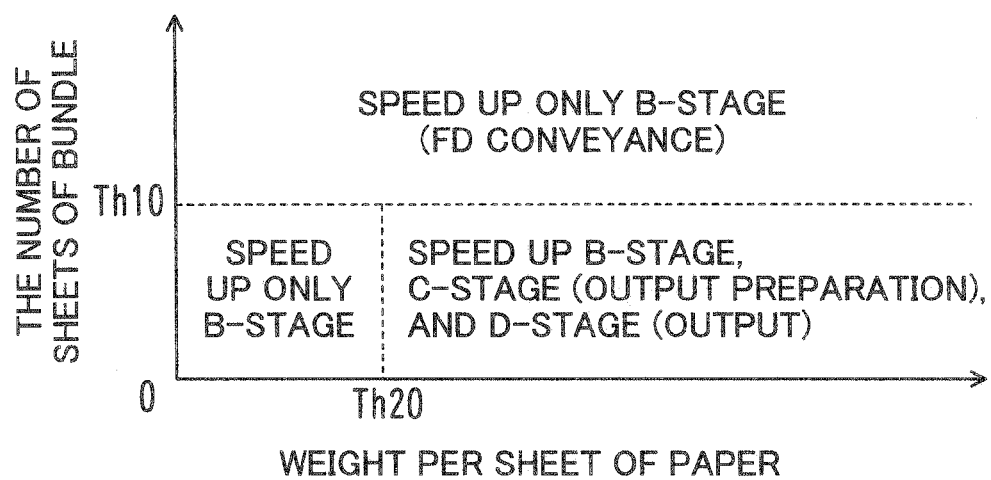
FIG. 13 is a diagram showing an example of classification of bundles when a stage for speeding up operation of a finisher is selected depending on bundles.

FIG. 13 is a diagram showing an example of classification of bundles when a stage for speeding up operation of the finisher 3 is selected depending on bundles.

Experiments confirmed that, the greater the number of sheets of a bundle is, the higher the possibility where the speeding up misaligns the bundle is. Experiments also confirmed that, the heavier the paper 9 is, i.e., the thicker the paper 9 is, the lower the possibility where the bundle is misaligned. In view of this, it is possible to select a stage for speeding up from among the B-stage through the D-stage depending on the number of sheets of the bundle and the weight of the paper 9.

In the example of FIG. 13, a stage for speeding up is determined by classification of the number of sheets and classification of the weight of the paper 9. To be specific, a threshold Th10 is used as the boundary for the former classification into two cases. A threshold Th20 is used as the boundary for the latter classification into two cases.

If the number of sheets exceeds the threshold Th10 (for example, 10 sheets), only the B-stage is selected as the target to be subjected to the speeding up irrespective of the weight of the paper 9. The reason why only the B-stage is selected is that, as described earlier, a bundle is less likely to be misaligned in the B-stage compared to the C-stage and the D-stage since the bundle is sandwiched between the trailing edge press guide 302 and the edge alignment guide 301 in the B-stage.

If the number of sheets is equal to or smaller than the threshold Th10, and at the same time, if the weight of the paper 9 per sheet is equal to or smaller than the threshold Th20 (for example, 4 grams), then only the B-stage is selected as the target to be subjected to the speeding up. If the number of sheets is equal to or smaller than the threshold Th10, and at the same time, if the weight of the paper 9 per sheet exceeds the threshold Th20, then the B-stage, the C-stage, and the D-stage are selected as the target to be subjected to the speeding up.

The weight [g] of the paper 9 per sheet is the product of an area $[m^2]$ of the paper 9 and a basis weight $[g/m^2]$. The threshold Th20 is so determined to speed up only the B-stage for the paper 9 lighter than an ordinary copy sheet which is of A4 size (297 mm×210 mm) and has a basis weight of 65 $[g/m^2]$.

The non-volatile memory 133 or another memory of the image forming apparatus 1 may store, in advance, a table which shows a weight of thick-specific paper per sheet of each regular size of choices of paper size, and also store data indicating the classification of FIG. 13. When a print job is entered into the image forming apparatus 1, the image forming apparatus 1 determines which stage of the B-stage through the D-stage is to be speeded up by obtaining, from the table, a paper size and a weight of paper per sheet indicated in configuration information for the print job, and referring to the data indicating the classification.

FIG. 14 is a timing chart showing an example in which a stage for speeding up is different between a bundle and another bundle.

Referring to FIG. 14, the number of sheets of the next bundle 92 is "1", and the current bundle process is to be speeded up. The number of sheets of the third bundle 93 is "1", and the fourth bundle 94 is conveyed following the third bundle 93. The next bundle process is therefore to be speeded up.

Suppose that, herein, the number of sheets of the current bundle 91 is greater than the threshold Th10. Since the number of sheets of the current bundle 91 is great, only the B-stage of the current bundle process is speeded up. Stated differently, speeding up is performed to prioritize the alignment of the bundle.

On the other hand, since the number of sheets of the next bundle 92 is smaller than the threshold Th10, three stages of the B-stage through the D-stage are speeded up. Stated differently, speeding up is performed to prioritize the printing productivity of the third bundle 93 and the fourth bundle 94.

As described earlier, when a time to complete the output of the current bundle 91 is later than a time to complete the prestacking of the next bundle 92, for example, when the post-processing controller 13 determines that way, the post-processing controller 13 of this embodiment performs a control in such a manner that at least a part of operation of the alignment mechanism 136 or of the output mechanism 137 is switched from the normal operation mode for operation at a normal operation speed to the high-speed operation mode for operation at an operation speed greater than the normal operation speed.

When a print command is given to print the third bundle 93 which is supposed to be outputted next to the next bundle 92 during prestacking of the next bundle 92 by the prestacking mechanism 138, the post-processing controller 13 performs a control in such a manner that at least a part of operation of the alignment mechanism 136 or of the output mechanism 137 is switched from the normal operation mode to the high-speed operation mode.

In this embodiment, whether or not to switch from the normal operation mode to the high-speed operation mode, i.e., whether or not speeding up is necessary, is determined by the post-processing controller 13. Instead of this, however, the main controller 11 or the print controller 12 may perform such a determination. Since each of the controllers 11-13 performs necessary processing in parallel with one another, and since each of the controllers 11-13 sends/receives the individual states and various instructions to/from one another through communication, any of the controllers 11-13 may perform such necessary processing including the determination. Note that "when a print command is given" may be a time at which the printer 2 is about to start print operation.

The terms "current bundle", "next bundle", and "bundle after the next bundle" of this embodiment are used for the case of focusing on the finisher 3. In this embodiment, roughly speaking, the "current bundle" is a bundle currently in the finisher 3, particularly, in the alignment tray 33 thereof, the "next bundle" is a bundle to be fed into the alignment tray 33 next to the "current bundle", namely, a bundle currently in the prestacking mechanism 138, and the "bundle after the next bundle" is a bundle to be fed into the alignment tray 33 next to the "next bundle", namely, a bundle to be fed into the prestacking mechanism 138 next. Therefore, in the printer 2, a bundle for which a print command is given based on a print job and for which printing is about to start is a "bundle after the next bundle".

Determination as to whether or not to switch from the normal operation mode to the high-speed operation mode may be performed before the start of print operation of the "bundle after the next bundle". Stated differently, the determination is possible before the "current bundle" or the "next bundle" is actually outputted to the finisher 3. For example, in a state where print jobs corresponding to the "current bundle" and the "next bundle" are being executed or wait to be executed, when a print job corresponding to the "bundle after the next bundle" is entered, the determination as to whether or not to switch from the normal operation mode to the high-speed operation mode is possible. The number of sheets and the paper size of each of the "current bundle", "next bundle", and "bundle after the next bundle" are found, which enables prediction of the subsequent progress state of conveyance of the "current bundle" and "next bundle". This makes it possible to predict whether or not a time to complete the output of the "current bundle" from the finisher 3 is later than a time to complete prestacking of the "next bundle". It is therefore preferable to determine to switch to the high-speed operation mode for the case where it is predicted that the time to complete the output of the "current bundle" from the finisher 3 is later than the time to complete prestacking of the "next bundle".

Suppose that a bundle for which the printer 2 is about to start printing is the "current bundle" or "subject bundle". In such a case, a bundle currently in the prestacking mechanism 138 is a "previous bundle", and a bundle currently in the alignment tray 33 is a "bundle before the previous bundle". In such a case, if no bundle is in the prestacking mechanism 138, then a bundle currently in the alignment tray 33 is a "previous bundle". In this view, the control is to make the finisher 3 hasten output operation of the "bundle before the previous bundle" to reduce the delay in starting the print operation on the bundle (subject bundle) for which printing operation is to start.

The description goes on to the process operation by the finisher 3 of the image forming apparatus 1, focusing on speeding up of the output operation of the finisher 3 with reference to flowcharts.

Figure 15:
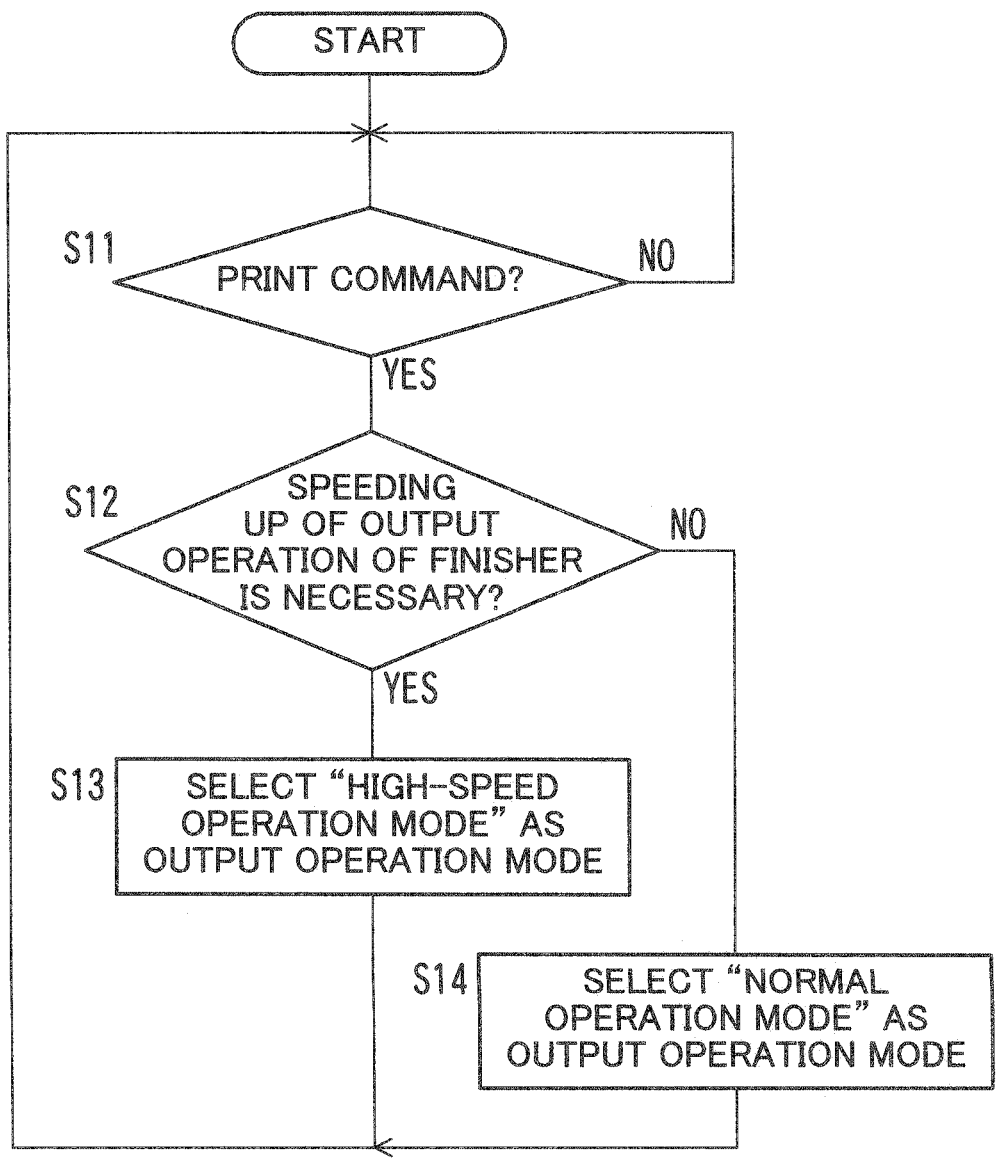
FIG. 15 is a flowchart for depicting the outline of process by a finisher of an image forming apparatus.

FIG. 15 is a flowchart for depicting the outline of process by the finisher 3 of the image forming apparatus 1.

With the image forming apparatus 1, in response to a print command (YES in Step S11), it is determined whether or not speeding up the finisher 3 is necessary (Step S12). If the speeding up is determined to be necessary (YES in Step S12), then the high-speed operation mode is selected (Step S13). If the speeding up is determined to be unnecessary (NO in Step S12), then the normal operation mode is selected (Step S14).

The print command may be a notification of the number of sheets and the paper size for a print job to be executed. The determination as to whether or not speeding up the finisher 3 is necessary may be made in response to a print command given at determination of execution of the print job, or given during a period after the determination until printing starts on the first sheet of paper of the print job. Hereinafter, the description goes on to the operation of the image forming apparatus 1 supposing that the post-processing controller 13 determines whether or the speeding up is necessary.

Figure 16:
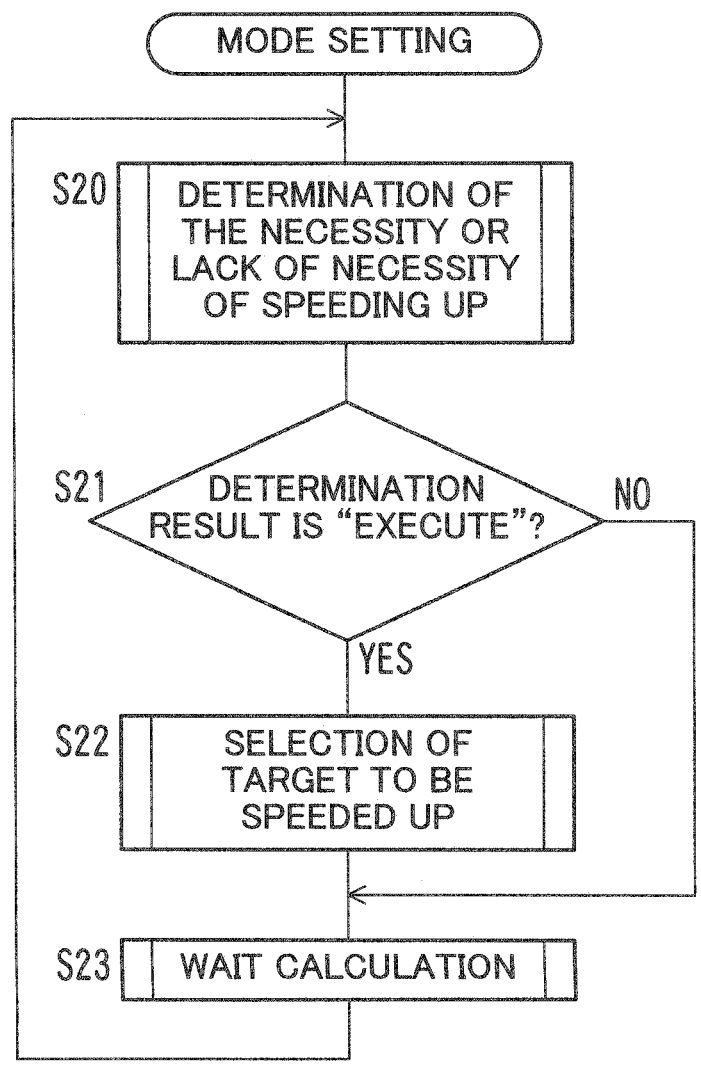
FIG. 16 is a flowchart for depicting mode setting related to output operation by a finisher.

FIG. 16 is a flowchart for depicting mode setting related to the output operation by the finisher 3. The routine for the mode setting, a subroutine for determining a wait, a routine for post-processing, and so on are executed in parallel with one another, and the processing proceeds with the progress thereof referred to by one another.

The post-processing controller 13 executes a routine for determining the necessity or lack of necessity of speeding up (Step S20). If the determination result in Step S20 is "execute" (YES in Step S21), then a routine for selecting the target to be speeded up is executed (Step S22), and then, a wait calculation routine (Step S23) is executed. Unless the determination result in Step S20 is "execute" (NO in Step S21), then the post-processing controller 13 executes the wait calculation routine (Step S23) without executing the routine for selecting the target to be speeded up (Step S22). The processing of Step S22 and Step S23 are examples of an operation target selection portion and an interval determining portion, respectively.

Figure 17:
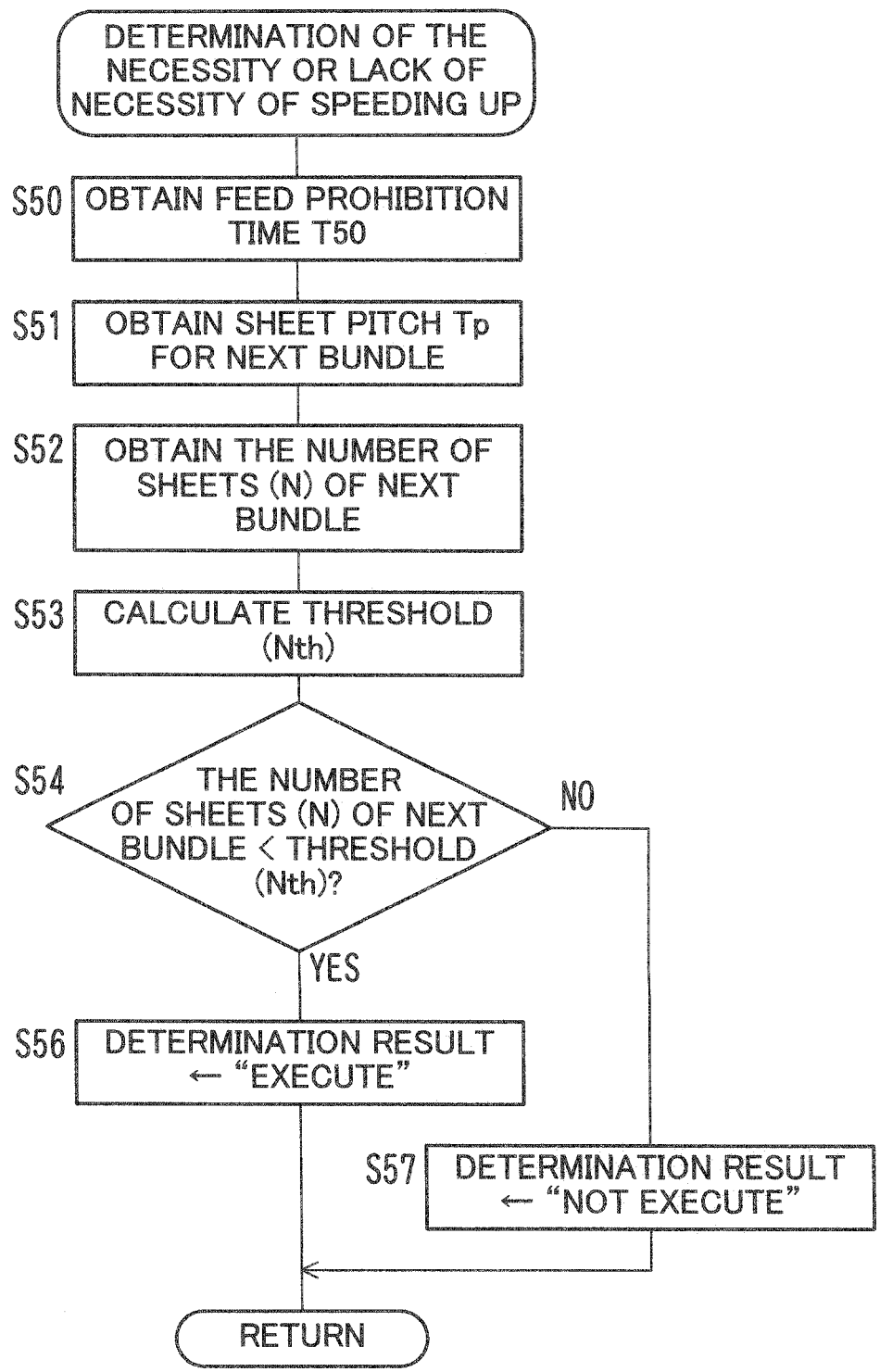
FIG. 17 is a flowchart of a routine for determining the necessity or lack of necessity of speeding up.

FIG. 17 is a flowchart of a routine for determining the necessity or lack of necessity of speeding up.

The post-processing controller 13 obtains the feed prohibition time T50 for the normal mode, the sheet pitch Tp for the next bundle 92, and the number of sheets (N) of the next bundle 92 (Step S50 through Step S52). To be specific, the feed prohibition time T50 is read out from the non-volatile memory 133. The sheet pitch Tp is calculated based on the paper size and the system speed obtained from the main controller 11. The sheet pitch Tp is the product of the length of the paper 9 in the conveyance direction and the system speed. The number of sheets (N) of the next bundle 92 is extracted from the information given by the main controller 11.

The post-processing controller 13 then calculates the threshold (Nth) (Step S53). As described above, the threshold (Nth) is a value obtained by dividing the feed prohibition time T50 by the sheet pitch Tp to round up the resultant to become an integer.

The post-processing controller 13 compares the number of sheets (N) and the threshold (Nth) (Step S54). If the number of sheets (N) is smaller than the threshold (Nth) (YES in Step S54), then the result of determination of the necessity or lack of necessity of the speeding up is "execute" (Step S56). If the number of sheets (N) is equal to or greater than the threshold (Nth) (NO in Step S54), then the post-processing controller 13 determines that the result of determination of the necessity or lack of necessity of the speeding up is "not execute" (Step S57).

Figure 18:
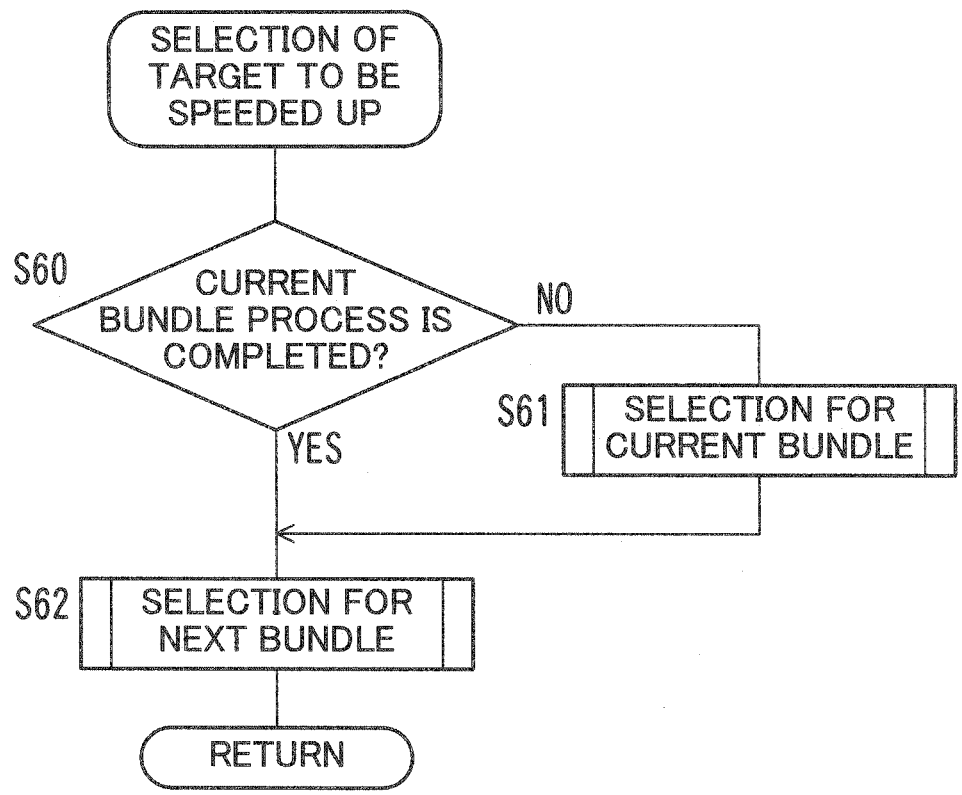
FIG. 18 is a flowchart of a routine for selecting a target to be speeded up.

FIG. 18 is a flowchart of the routine, in FIG. 16, for selecting the target to be speeded up.

The post-processing controller 13 checks whether or not the output of the current bundle process is completed (Step S60). If the check result is NO, then the post-processing controller 13 executes the selection routine for the current bundle (Step S61). If the check result is YES, then the post-processing controller 13 executes the selection routine for the next bundle (Step S62).

Figure 19:
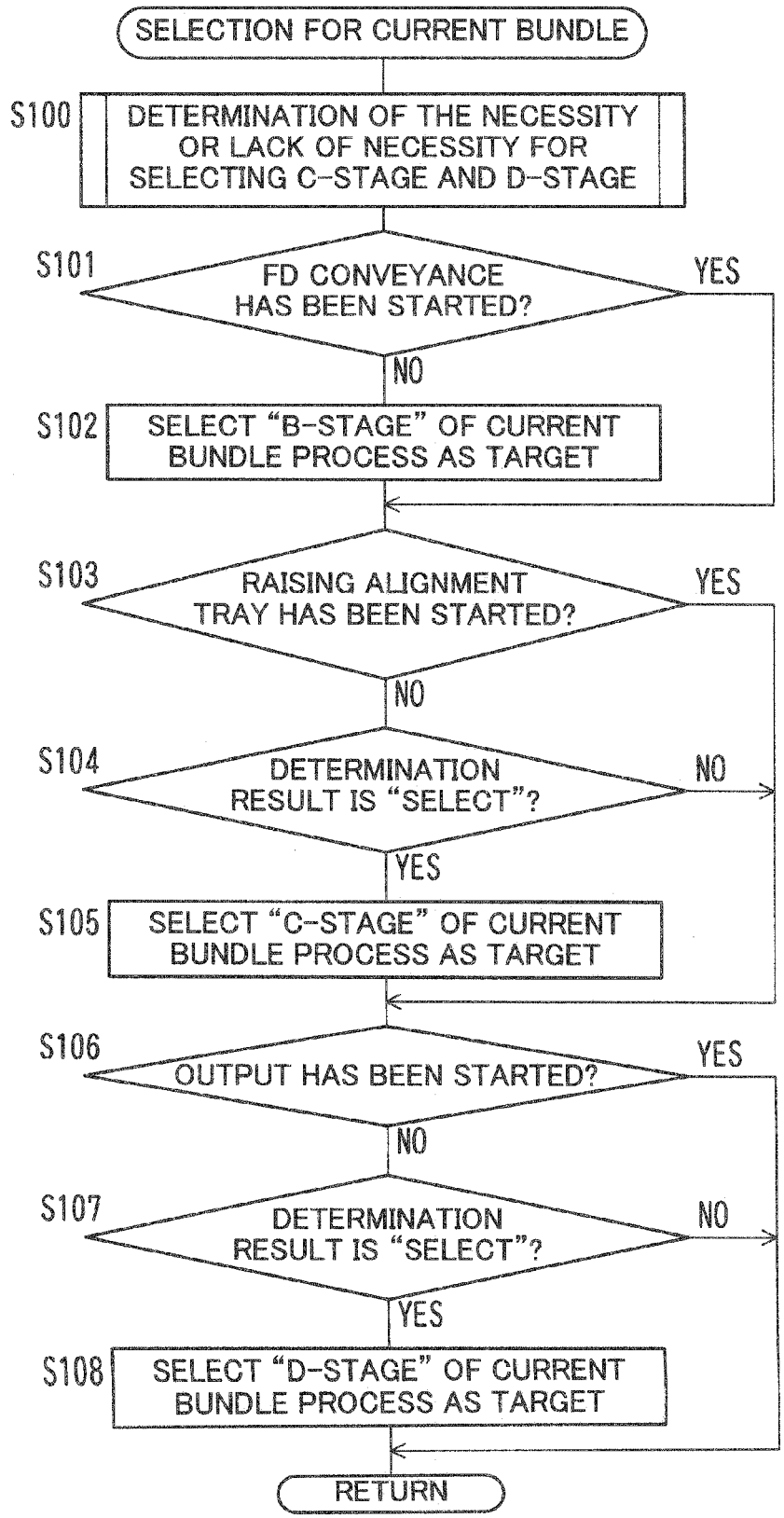
FIG. 19 is a flowchart of a selection routine for a current bundle.

FIG. 19 is a flowchart of the selection routine, in FIG. 18, for the current bundle.

The post-processing controller 13 executes a subroutine for determining the necessity or lack of necessity for selecting the C-stage and the D-stage (Step S100). This determines whether or not the C-stage and the D-stage of the current bundle process are to be speeded up.

Thereafter, the post-processing controller 13 checks the progress of the current bundle process at this time point in the following manner, and, based on the check result, selects each of the B-stage, C-stage, and the D-stage as the target to be speeded up (Step S101 through Step S108).

If the FD conveyance (B-stage) has not yet been started (NO in Step S101), then the post-processing controller 13 selects the B-stage of the current bundle process as the target to be speeded up (Step S102). In short, the B-stage is determined to be speeded up. If the FD conveyance has already been started (YES in Step S101), then the processing in Step S102 is not executed because the FD conveyance cannot be speeded up. In such a case, the post-processing controller 13 does not select the B-stage as the target to be speeded up, and continues the process at a normal speed.

If raising the alignment tray 33 (C-stage) has not yet been started (NO in Step S103), then the post-processing controller 13 checks whether or not the determination result in Step S100 for the C-stage is "select" (Step S104). If the check result is "YES", then the post-processing controller 13 selects the C-stage of the current bundle process as the target to be speeded up (Step S105). If the C-stage has already been started (YES in Step S103), and if the determination result in Step S100 is not "select" (NO in Step S104), then the C-stage is not selected as the target to be speeded up.

If the output of the current bundle 91 (D-stage) has not yet been started (NO in Step S106), then the post-processing controller 13 checks whether or not the determination result in Step S100 is "select" (Step S107). If the check result is "YES", then the post-processing controller 13 selects the D-stage of the current bundle process as the target to be speeded up (Step S108). If the D-stage has already been started (YES in Step S106), and if the determination result of Step S100 is not "select" (NO in Step S107), then the D-stage is not selected as the target to be speeded up.

Figure 20:
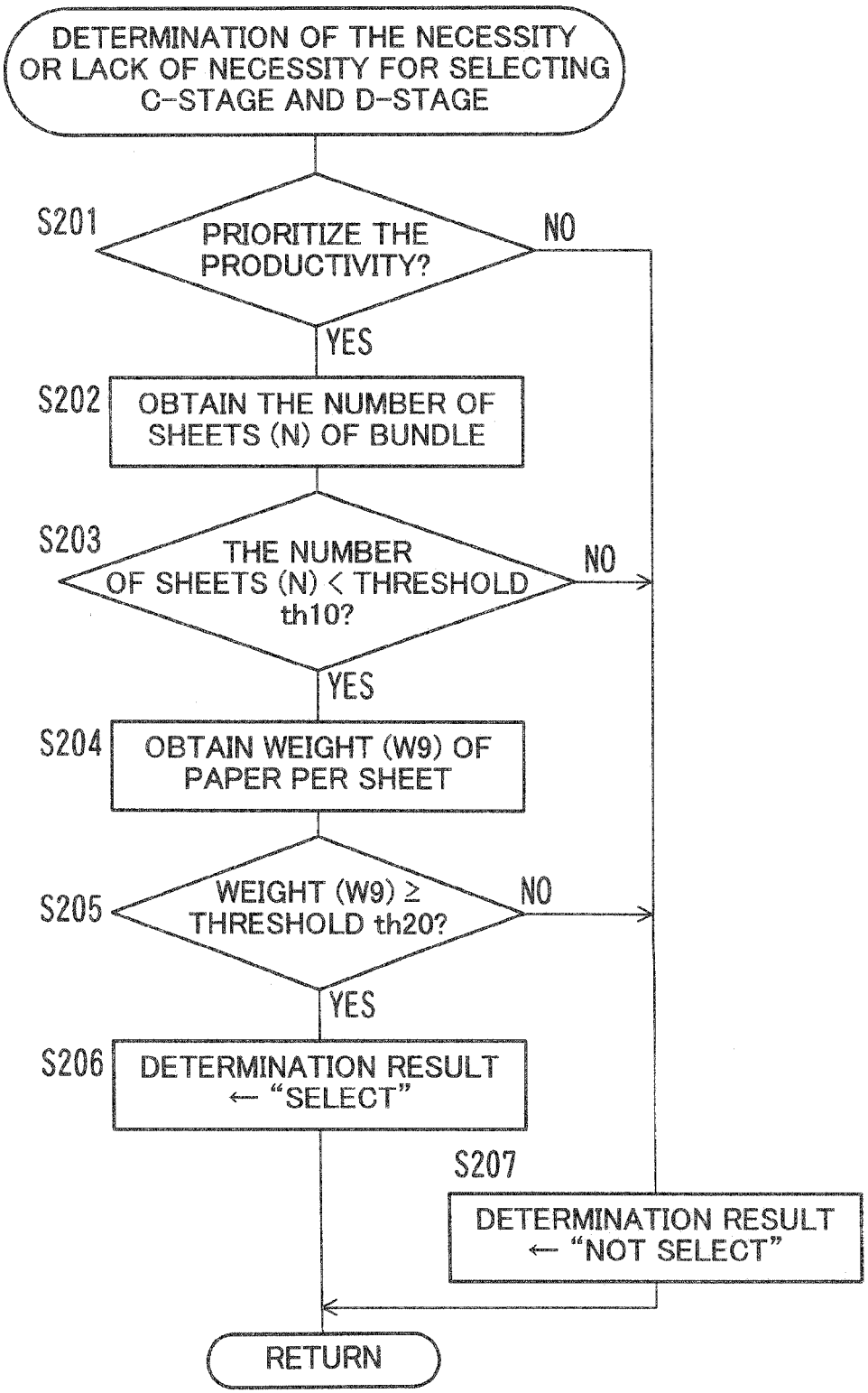
FIG. 20 is a flowchart of a subroutine for determining the necessity or lack of necessity of selection of a C-stage and a D-stage.

FIG. 20 is a flowchart of the subroutine for determining the necessity or lack of necessity for selecting the C-stage and the D-stage of FIG. 19.

The image forming apparatus 1 has a manual mode setting function with which the user can select whether or not to permit the speeding up of the C-stage and the D-stage of the operation by the finisher 3. If the setting to permit the speeding up is not selected by the user, then the post-processing controller 13 determines that he/she does not wish to prioritize the productivity (NO in Step S201), and sets "not select" as the determination result (Step S207). This determines that the C-stage and the D-stage are not speeded up.

On the other hand, if the setting to permit the speeding up is selected by the user, then the post-processing controller 13 determines that he/she wishes to prioritize the productivity (YES in Step S201), and determines whether or not to speed up the C-stage and the D-stage in accordance with the classification of FIG. 13 in the following manner.

The post-processing controller 13 obtains the number of sheets (N) of the current bundle 91 (Step S202), and compares the number of sheets (N) and the threshold th10 (Step S203). If the number of sheets (N) is equal to or greater than the threshold th10 (NO in Step S203), then the processing goes to Step S207, and the post-processing controller 13 sets "not select" as the determination result.

If the number of sheets (N) is smaller than the threshold th10 (YES in Step S203), then the post-processing controller 13 obtains a weight (W9) of the paper 9 per sheet (Step S204), and compares the weight (W9) and the threshold th20 (Step S205). If the weight (W9) is equal to or greater than the threshold th20 (YES in Step S205), then the processing goes to Step S206, and the post-processing controller 13 sets "select" as the determination result. If the weight (W9) is smaller than the threshold th20 (NO in Step S205), then the processing goes to Step S207, and the post-processing controller 13 sets "not select" as the determination result.

Figure 21:
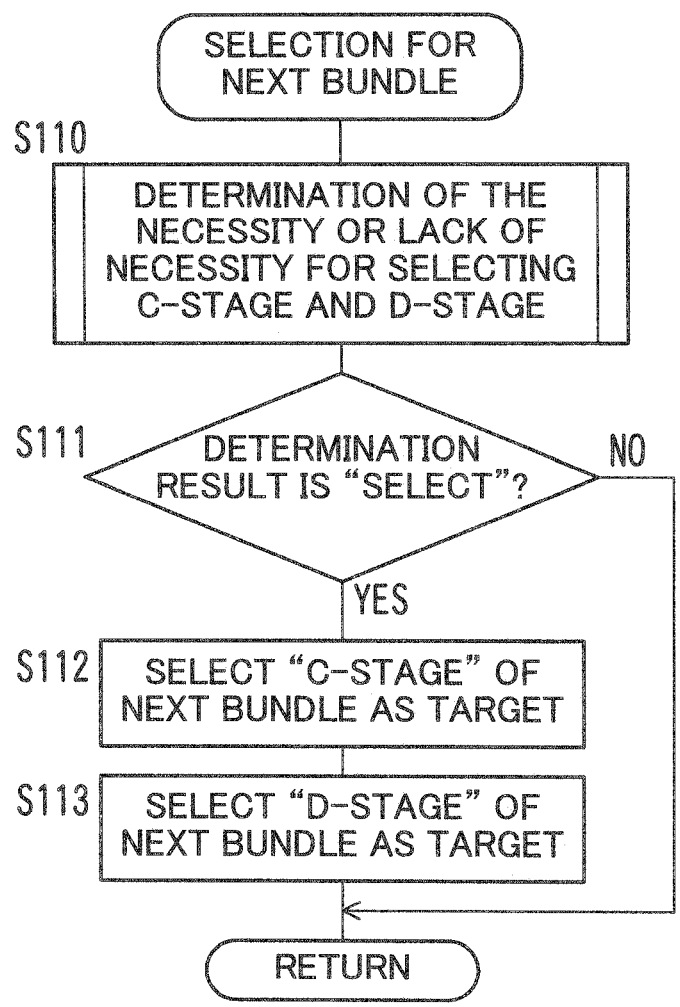
FIG. 21 is a flowchart of a selection routine for the next bundle.

FIG. 21 is a flowchart of the selection routine, in FIG. 18, for the next bundle.

The post-processing controller 13 executes the subroutine for determining the necessity or lack of necessity for selecting the C-stage and the D-stage (Step S110). In the subroutine, the necessity or lack of necessity of speeding up of the C-stage and the D-stage is determined as with the subroutine of FIG. 20. However, the subroutine of Step S110 of FIG. 21 is to make a determination for the next bundle process while the subroutine of FIG. 20 is to make a determination for the current bundle process.

The post-processing controller 13 checks whether or not the determination result in Step S110 is "select" (Step S111). If the check result is "YES", then the post-processing controller 13 selects the C-stage and the D-stage of the next bundle process as the target to be speeded up (Step S112 and Step S113). If the determination result in Step S110 is not "select" (NO in Step S111), then the C-stage and the D-stage of the next bundle process are not selected as the target to be speeded up.

Figure 22:
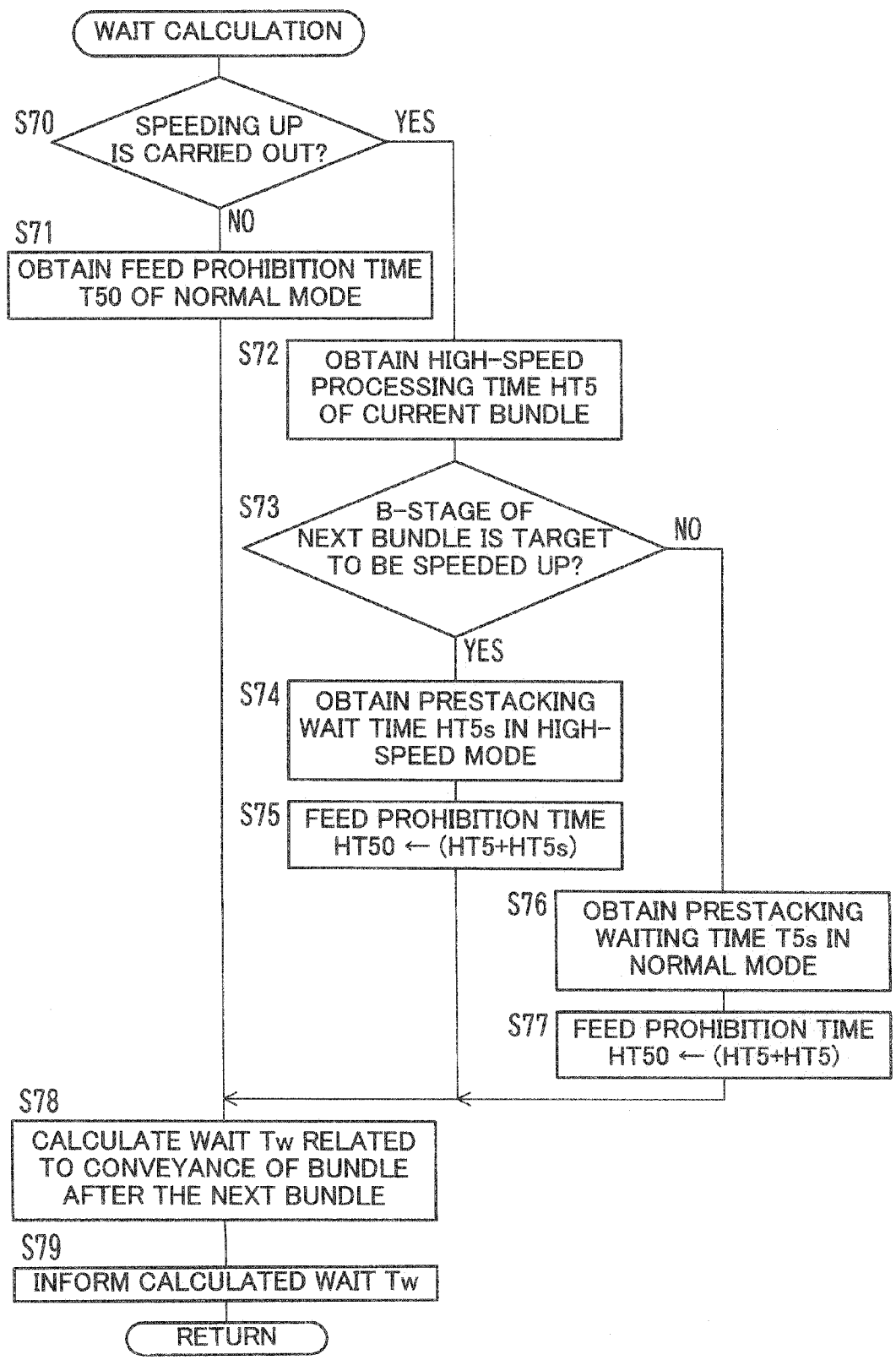
FIG. 22 is a flowchart of a wait calculation routine.

FIG. 22 is a flowchart of the wait calculation routine in FIG. 16.

The post-processing controller 13 checks the result of the determination, made in Step S20 of FIG. 16, as to whether or not to carry out the speeding up (Step S70).

If the result of the determination as to whether or not to carry out the speeding up is not "execute" (NO in Step S70), then the post-processing controller 13 obtains the feed prohibition time T50 (see (a) of FIG. 11) of the normal mode (Step S71), and calculates a wait Tw2 related to conveyance of the third bundle 93 (Step S78). The wait Tw2 corresponds to a time obtained by subtracting both the sheet pitch Tp and the time T1 from the feed prohibition time T50. The post-processing controller 13 informs the main controller 11 of the wait Tw2 thus calculated (Step S79).

If the result of the determination as to whether or not to carry out the speeding up is "execute" (YES in Step S70), then the post-processing controller 13 obtains the high-speed processing time HT5 of the current bundle process shown in (b) of FIG. 11 and FIG. 14. The post-processing controller 13 then checks whether or not the B-stage of the next bundle process is the target to be speeded up as shown in the example of FIG. 14 (Step S73). In short, the post-processing controller 13 checks whether or not the determination result is "execute" in the routine of FIG. 17.

If the B-stage of the next bundle process is the target to be speeded up (YES in Step S73) as shown in the example of (b) of FIG. 11, then the post-processing controller 13 obtains the prestacking wait time HT5s (see FIG. 14) in the high-speed mode (Step S74), and sets the sum of the high-speed processing time HT5 and the prestacking wait time HT5s as the feed prohibition time HT50 in the high-speed mode (Step S75). The post-processing controller 13 calculates a wait Tw2 related to conveyance of the third bundle 93 to inform the main controller 11 of the wait Tw2 (Step S78 and Step S79).

On the other hand, if the B-stage of the next bundle process is not the target to be speeded up (NO in Step S73) as shown in the example of (b) of FIG. 11, then the post-processing controller 13 obtains the prestacking waiting time T5s in the normal mode (Step S76), and sets the sum of the high-speed processing time HT5 and the prestacking waiting time T5s as the feed prohibition time HT50 in the high-speed mode (Step S77). The post-processing controller 13 then calculates a wait Tw3 related to conveyance of the third bundle 93 to inform the main controller 11 of the wait Tw3 (Step S78 and Step S79).

Figure 23:
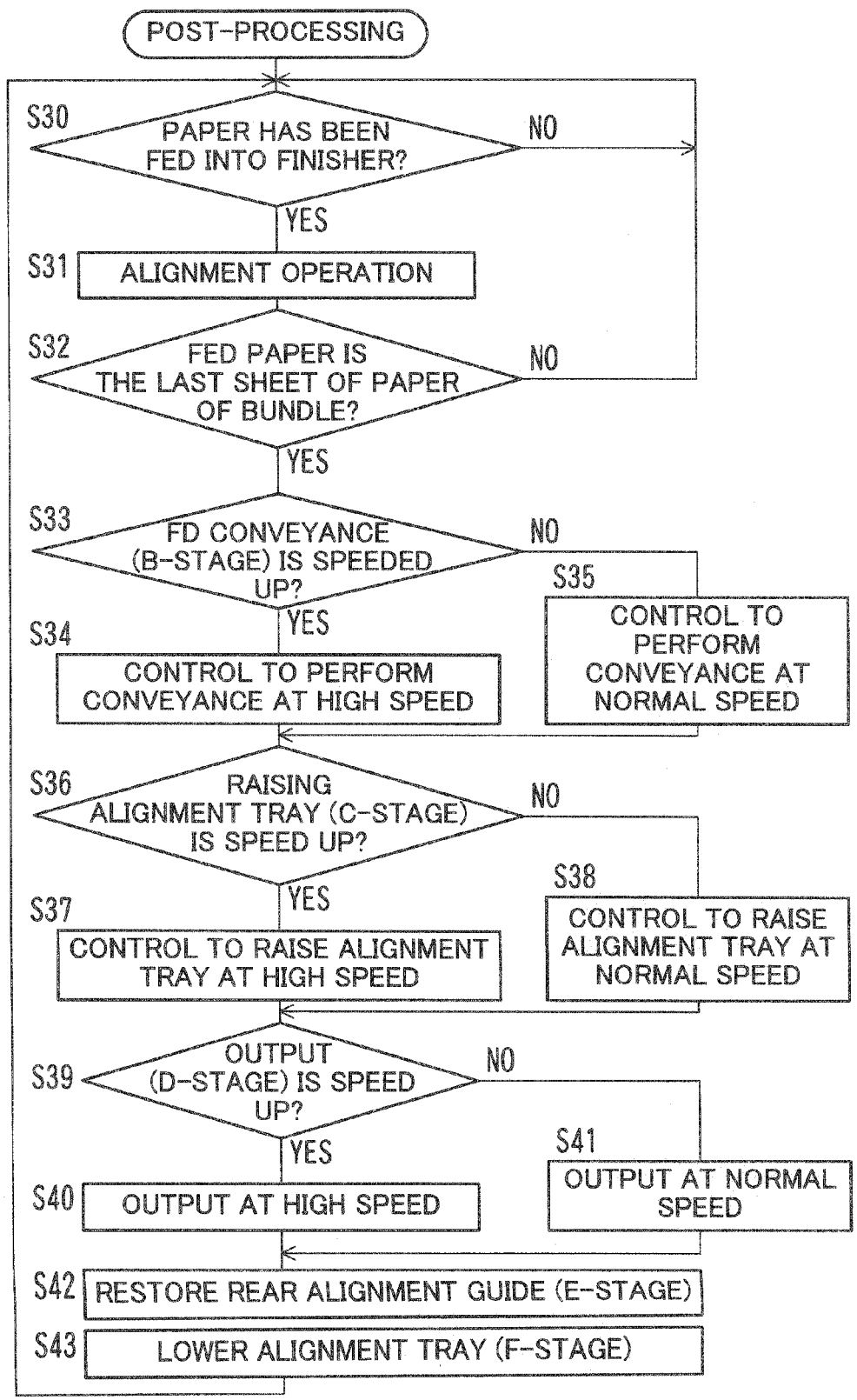
FIG. 23 is a flowchart of a post-processing routine.

FIG. 23 is a flowchart of the post-processing routine.

The post-processing controller 13 checks whether or not the paper 9 has been fed into the finisher 3 (Step S30). If it is determined, based on an output notification from the print controller 12, that the paper 9 has been fed into the finisher 3 (YES in Step S30), then the post-processing controller 13 controls the finisher 3 to perform the alignment operation (Step S31). If the paper 9 fed is not the last sheet of paper 9e of the bundle (NO in Step S32), then the processing goes back to Step S30.

If the paper 9 fed is the last sheet of paper 9e of the bundle (YES in Step S32), then the post-processing controller 13 controls the finisher 3 to perform the output preparation, the output, and the feeding preparation in the following manner.

If the FD conveyance (B-stage) is selected as the target to be speeded up (YES in Step S33), then the post-processing controller 13 controls the finisher 3 to perform the FD conveyance at a speed higher than that in the normal mode (Step S34). If the FD conveyance is not selected as the target to be speeded up (NO in Step S33), then the post-processing controller 13 controls the finisher 3 to perform the FD conveyance at a normal speed (Step S35).

If raising the alignment tray 33 (C-stage) is selected as the target to be speeded up (YES in Step S36), then the post-processing controller 13 controls the finisher 3 to raise the alignment tray 33 at a speed higher than that in the normal mode (Step S37). If raising the alignment tray 33 is not selected as the target to be speeded up (NO in Step S36), then the post-processing controller 13 controls the finisher 3 to raise the alignment tray 33 at a normal speed (Step S38).

If outputting the bundle (D-stage) is selected as the target to be speeded up (YES in Step S39), then the post-processing controller 13 controls the finisher 3 to move the rear alignment guide 305 at a speed higher than that in the normal mode to output the bundle (Step S40). If outputting the bundle is not selected as the target to be speeded up (NO in Step S39), then the post-processing controller 13 controls the finisher 3 to output the bundle (Step S41).

After that, the post-processing controller 13 controls the finisher 3 to restore the rear alignment guide 305 (E-stage) and to lower the alignment tray 33 (F-stage) (Step S42 and Step S43).

According to this embodiment, when a time to convey the third bundle 93 or the fourth bundle 94 is not rate-controlling, either one or both of the current bundle process and the next bundle process are speeded up. This reduces a delay in printing due to an unfinished process by the finisher 3. Therefore, a time to wait for a print job is reduced, so that the printing productivity is improved.

As discussed above, according to the present invention, a delay in conveying a sheet to the post-processing device due to an unfinished process by the post-processing device is reduced, so that the printing productivity is improved.

In this embodiment, the example is taken in which the B-stage, C-stage, and D-stage are choices of the target to be speeded up. Instead of this, however, any one or more of the B-stage, C-stage, D-stage, E-stage, and F-stage may be choices of the target to be speeded up.

In this embodiment, the configuration is exemplified in which the post-processing controller 13 calculates the wait Tw1 through the wait Tw5. The present invention is not limited to the configuration. The following configuration is also possible. The main controller 11 or the printer controller 12 performs communication with the post-processing controller 13 to find a status of the finisher 3, and the wait Tw1 through the wait Tw5 may be so set that the paper 9 starts to be fed into the finisher 3 at a time at which no troubles occur in operation of the finisher 3. As discussed above, the content of the processing by the main controller 11, the printer controller 12, and the post-processing controller 13, and the content of the control by the main controller 11, the printer controller 12, and the post-processing controller 13 may be changed with one another. The main controller 11, the printer controller 12, and the post-processing controller 13 may serve as a "control unit" or "control device" of the present invention.

It is to be understood that the configurations of the image forming apparatus 1, the printer 2, and the finisher 3, the constituent elements thereof, the content and order of the processing, and the like can be appropriately modified without departing from the spirit of the present invention. For example, the present invention is not limited to the structure where the alignment tray 33 and the paper exit tray 36 are provided along the CD direction. The present invention is also applicable to the structure where the alignment tray 33 and the paper exit tray 36 are provided along the FD direction. It is not always necessary that the post-processing controller 13 and a mechanism portion to be controlled thereby are provided as one unit.

In the embodiment, as an example of the post-processing device, the finisher 3 is taken which is provided in the last stage of the image forming apparatus 1. The present invention is not limited thereto. The post-processing device may be a device which applies a process onto a sheet at any stage of a process for creating a printed matter for the user.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A post-processing device for applying a post-process to one or more sheets outputted by a device of a preceding stage, the post-processing device comprising:
   a CPU;
   an alignment mechanism which includes a sheet rest to which the one or more sheets outputted by the device of the preceding stage are output, and which applies an alignment process for arranging a current sheet bundle that is a sheet bundle of the one or more sheets and that is output to the sheet rest;

an output mechanism which outputs the current sheet bundle that has been subjected to the alignment process by the alignment mechanism outside the sheet rest; and a prestacking mechanism which preforms prestacking of temporarily keeping, upstream of the sheet rest, a next sheet bundle which is a sheet bundle outputted by the device of the preceding stage before the output mechanism outputs the current sheet bundle, and which puts, in the sheet rest, the next sheet bundle that has been subjected to the prestacking after the current sheet bundle is outputted by the output mechanism, wherein the output mechanism includes:

an FD conveyance portion which conveys the current sheet bundle that has been subjected to the alignment process by the alignment mechanism in a downstream direction to an output standby position of the sheet rest;

a sheet rest posture changing portion which switches a posture of the sheet rest between a first state in which a sheet outputted by the device of the preceding stage is acceptable and a second state in which the current sheet bundle at the output standby position of the sheet rest is outputtable; and a pushing portion which, when the sheet rest is switched to the second state by the sheet rest posture changing portion, pushes out the current sheet bundle from the output standby position of the sheet rest, wherein the CPU determines whether or not a time when the pushing portion pushes out the current sheet bundle from the output standby position of the sheet rest is later than a time when the prestacking mechanism completes performing the prestacking of the next sheet bundle, and wherein when the CPU determines that the time when the pushing portion pushes out the current sheet bundle is later than the time when the prestacking mechanism completes performing the prestacking of the next sheet bundle, the CPU performs control such that, for the current sheet bundle, an operation of at least one of the alignment mechanism, the FD conveyance portion, the sheet rest posture changing portion, and the pushing portion is switched from a normal operation mode for operation at a normal operation speed to a high-speed operation mode for operation at an operation speed greater than the normal operation speed.

2. The post-processing device according to claim 1, wherein the CPU determines that the time when the pushing portion pushes out the current sheet bundle from the output standby position of the sheet rest is later than the time when the prestacking mechanism completes performing the prestacking of the next sheet bundle, if a number of sheets of the next sheet bundle is smaller than a predetermined number of sheets.

3. The post-processing device according to claim 2, wherein the predetermined number of sheets is obtained by dividing a normal mode feed prohibition time corresponding to the current sheet bundle by a time pitch of two sheets successively outputted by the device of the preceding stage, and rounding up a resultant value to become an integer.

4. The post-processing device according to claim 1, wherein the CPU determines which ones of the alignment mechanism, FD conveyance portion, the sheet rest posture changing portion, and the pushing portion is to be switched from the normal operation mode to the high-speed operation mode based on a size, type, and quantity of a sheet of each sheet bundle.

5. The post-processing device according to claim 1, wherein the CPU is configured to operate as an operation target selection portion for selecting which ones of the alignment mechanism, the FD conveyance portion, the sheet rest posture changing portion, and the pushing portion is to be switched from the normal operation mode to the high-speed operation mode.

6. The post-processing device according to claim 1, wherein the CPU performs control such that, for at least one of the current sheet bundle and the next sheet bundle, an operation of at least one of the alignment mechanism, the FD conveyance portion, the sheet rest posture changing portion, and the pushing portion is switched from the normal operation mode to the high-speed operation mode, when a print command corresponding to a bundle after the next sheet bundle which is supposed to be outputted next to the next sheet bundle from the device of the preceding stage is detected, and further, when outputting of the current sheet bundle and the next sheet bundle by the pushing portion has not yet been completed.

7. The post-processing device according to claim 6, wherein the CPU performs control such that, for the current sheet bundle, the operation of at least one of the alignment mechanism, the FD conveyance portion, the sheet rest posture changing portion, and the pushing portion is switched from the normal operation mode to the high-speed operation mode when the pushing portion pushes out the current sheet bundle from the output standby position of the sheet rest.

8. The post-processing device according to claim 6, wherein the CPU performs control such that, for the next sheet bundle, the operation of at least one of the alignment mechanism, the FD conveyance portion, the sheet rest posture changing portion, and the pushing portion is switched from the normal operation mode to the high-speed operation mode when the pushing portion pushes out the current sheet bundle from the output standby position of the sheet rest.

9. The post-processing device according to claim 1, wherein the CPU in configured to operate as an interval determining portion for determining a conveyance interval between successive sheet bundles.

10. An image forming apparatus comprising:

a printer which, in response to a print command, prints onto one or more sheets and which outputs said one or more sheets to a post-processing device;

the post-processing device which applies a post-process to said one or more sheets outputted by the printer; and a CPU which controls the printer and the post-processing device, wherein the post-processing device includes:

an alignment mechanism which includes a sheet rest to which said one or more sheets outputted by the printer are output, and which applies an alignment process for arranging a current sheet bundle that is a sheet bundle of the one or more sheets and that is output to the sheet rest, an output mechanism which outputs the current sheet bundle that has been subjected to the alignment process by the alignment mechanism outside the sheet rest, and a prestacking mechanism which performs prestacking of temporarily keeping, upstream of the sheet rest, a next sheet bundle which is a sheet bundle outputted by the printer before the output mechanism outputs the current sheet bundle, and which puts, in the sheet rest, the next sheet bundle that has been subjected to the prestacking after the current sheet bundle is outputted by the output mechanism, wherein the output mechanism includes:
- an FD conveyance portion which conveys the current sheet bundle that has been subjected to the alignment process by the alignment mechanism in a downstream direction to an output standby position of the sheet rest;
- a sheet rest posture changing portion which switches a posture of the sheet rest between a first state in which a sheet outputted by the printer is acceptable and a second state in which the current sheet bundle at the output standby position of the sheet rest is outputtable; and
- a pushing portion which, when the sheet rest is switched to the second state by the sheet rest posture changing portion, pushes out the current sheet bundle from the output standby position of the sheet rest, wherein the CPU determines whether or not a time when the pushing portion pushes out the current sheet bundle from the output standby position of the sheet rest is later than a time when the prestacking mechanism completes performing the prestacking of the next sheet bundle, and wherein when the CPU determines that the time when the pushing portion pushes out the current sheet bundle is later than the time when the prestacking mechanism completes performing the prestacking of the next sheet bundle, the CPU performs control such that, for the current sheet bundle, an operation of at least one of the alignment mechanism, the FD conveyance portion, the sheet rest posture changing portion, and the pushing portion is switched from a normal operation mode for operation at a normal operation speed to a high-speed operation mode for operation at an operation speed greater than the normal operation speed.

11. The image forming apparatus according to claim 10, wherein the CPU performs control such that, for at least one of the current sheet bundle and the next sheet bundle, an operation of at least one of the alignment mechanism, the FD conveyance portion, the sheet rest posture changing portion, and the pushing portion is switched from the normal operation mode to the high-speed operation mode, when a print command corresponding to a bundle after the next sheet bundle is given, and further, when outputting of the current sheet bundle and the next sheet bundle by the pushing portion has not yet been completed.

12. The image forming apparatus according to claim 10, wherein the first state is a state in which the sheet rest is lowered so that the sheet outputted by the printer is acceptable, and wherein the second state is a state in which the sheet rest is raised so that the current sheet bundle at the output standby position of the sheet rest is outputtable to an external tray.

13. The post-processing device according to claim 1, wherein the first state is a state in which the sheet rest is lowered so that the sheet outputted by the device of the preceding stage is acceptable, and wherein the second state is a state in which the sheet rest is raised so that the current sheet bundle at the output standby position of the sheet rest is outputtable to an external tray.

* * * * *